(12) United States Patent
Satoh

(10) Patent No.: US 6,968,084 B2
(45) Date of Patent: Nov. 22, 2005

(54) SPECIFIC POINT DETECTING METHOD AND DEVICE

(75) Inventor: Kiyohide Satoh, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 747 days.

(21) Appl. No.: 09/817,037

(22) Filed: Mar. 27, 2001

(65) Prior Publication Data
US 2002/0126895 A1  Sep. 12, 2002

(30) Foreign Application Priority Data
Mar. 6, 2001 (JP) .............................. 2001-062222

(51) Int. Cl.$^7$ .............................................. G06K 9/46
(52) U.S. Cl. ....................... 382/190; 382/181; 351/209
(58) Field of Search ................................ 382/100, 181, 382/190, 200, 201; 348/39, 47, 48, 150, 38, 348/42, 43, 44, 46, 151; 351/209, 210

(56) References Cited

U.S. PATENT DOCUMENTS

| | | | | |
|---|---|---|---|---|
| 5,646,679 A | * | 7/1997 | Yano et al. ..................... | 348/47 |
| 5,798,791 A | * | 8/1998 | Katayama et al. ........ | 348/218.1 |
| 6,191,808 B1 | * | 2/2001 | Katayama et al. ............ | 348/39 |
| 6,211,911 B1 | * | 4/2001 | Komiya et al. .......... | 348/218.1 |
| 6,332,038 B1 | * | 12/2001 | Funayama et al. .......... | 382/190 |
| 6,333,997 B1 | * | 12/2001 | Hashiya et al. ............. | 382/201 |
| 6,522,312 B2 | | 2/2003 | Ohshima et al. | |

FOREIGN PATENT DOCUMENTS

JP  11-136706  5/1999
JP  2000-275013  10/2000

OTHER PUBLICATIONS

"Intuitive Control of 'Bird's Eye' Viewpoint Using Interlocked Motion of Coordinate Pairs for Navigation in a Virtual Environment", Shinji Fukatsu et al., The Journal of the Institute of Electronics, Information and Communication Engineers, vol. J83-D-II, No. 9, pp. 1905-1915, Sep. 2000.
"Mixed Reality" Memoir of Institute of Image Information and Television Engineers (1998), Hideyuki Tamura et al., vol. 52, No. 3, pp. 266-272.

(Continued)

Primary Examiner—Knajibhai Patel
Assistant Examiner—Abolfazl Tabatabai
(74) Attorney, Agent, or Firm—Fitzpatrick, Cella, Harper & Scinto

(57) ABSTRACT

A template image creation module generates in predetermined timing a template image corresponding to a landmark existing in a real space from a fixed viewpoint image obtained from a fixed camera, and provides the template image to a landmark detection module, thereby updating a template image for use in template matching. The landmark detection module performs template matching for a photographed image from an observer viewpoint camera that is mounted on a HMD and moves along with an observer, using the template image updated by the template image creation module to detect the position of the landmark in the photographed image. In this way, specific points can be reliably detected from a photographed image, even if the environment during picture-taking is changed to cause changes in how specific points are viewed.

44 Claims, 17 Drawing Sheets

OTHER PUBLICATIONS

"AR$^2$ Hockey System: A Collaborative Mixed Reality System", Memoir of Institute of Nippon Virtual Reality (1998), Toshikazu Ohshima, vol. 3, No. 2, pp. 55-60.

"A Viewpoint Dependent Stereoscopic Display Method with Interpolation and Reconstruction of Multi-Viewpoint Images", Akihiro Katayama et al., Memoir of Institute of Electronics, Information and Communication Engineers (May 1996) vol. J79-D-II No. 5, pp. 803-811.

"Multiple-Camera Based Hand Pose Estimation Method Using Distance Transformation", Utsumi et al., Memoir of Institute of Image Information and Television Engineers (1997), vol. 51 No. 12, pp. 2116-2125.

* cited by examiner

FIG.13B

| | INTENSITY RANGE A | INTENSITY RANGE B | INTENSITY RANGE C |
|---|---|---|---|
| LANDMARK #1 | $T_{1A}$ | $T_{1B}$ | $T_{1B}$ |
| LANDMARK #2 | $T_{2A}$ | $T_{2B}$ | $T_{2C}$ |
| LANDMARK #3 | $T_{3A}$ | $T_{3B}$ | $T_{3C}$ |

1310 TEMPLATE IMAGE

FIG.16

| CAMERA F | | CAMERA G | | CAMERA H | |
|---|---|---|---|---|---|
| LANDMARK | TEMPLATE IMAGE | LANDMARK | TEMPLATE IMAGE | LANDMARK | TEMPLATE IMAGE |
| $P_1$ | $T_1^F$ | | | | |
| $P_2$ | $T_2^F$ | | | | |
| $P_3$ | $T_3^F$ | $P_3$ | $T_3^G$ | | |
| $P_4$ | $T_4^F$ | $P_4$ | $T_4^G$ | | |
| $P_5$ | $T_5^F$ | $P_5$ | $T_5^G$ | | |
| $P_6$ | $T_6^F$ | $P_6$ | $T_6^G$ | | |
| | | $P_7$ | $T_7^G$ | $P_7$ | $T_7^H$ |
| | | $P_8$ | $T_8^G$ | $P_8$ | $T_8^H$ |
| | | | | $P_9$ | $T_9^H$ |
| | | | | $P_{10}$ | $T_{10}^H$ |
| | | | | $P_{11}$ | $T_{11}^H$ |
| | | | | $P_{12}$ | $T_{12}^H$ |

SPECIFIC POINT DETECTING METHOD AND DEVICE

FIELD OF THE INVENTION

The present invention relates to a specific point detecting method and device for detecting specific points of a static object, such as landmarks from an image.

BACKGROUND OF THE INVENTION

In recent years, researches as to mixed reality (hereinafter referred to as MR technique) intended for displaying additional information and virtual objects (hereinafter generically referred to as virtual images) in a superimposed manner in a real space have been vigorously conducted. Among them, attention is being given to systems in which an observer wears a head-mounted display (hereinafter referred to as HMD) of the video see-through type to render virtual images superimposed on real images that are shot by a camera included in or mounted on the HMD with the real space and the virtual space being three-dimensionally registered, and display the resulting mixed reality images (hereinafter referred to as MR images) on the HMD in real time (herein, these systems are referred to as MR systems).

Registration of the virtual image and the real image is a prime challenge in the MR system, and for achieving it, it is necessary to measure accurately the viewpoint position and posture of the camera. Generally, if positions on photographed images at a plurality of points (theoretically three points or more, and six points or more for stable solution) for which three positions are known, the viewpoint position and posture of the camera can be determined from their correspondence relations (Herein, points like these are generically referred to as landmarks). That is, the problem of registration depends on how accurately the landmark is tracked or detected from within the image photographed with a moving camera to obtain its position.

The inventors have previously developed devices applying the MR technique in fields such as games. These devices are based on indoor use.

In indoor uses as described above, characteristic markers (characteristic colors such as red and green arranged in monochrome or in combination, and characteristic patterns such as checked patterns and concentric circles are often used) are arranged in a target space, and are set as landmarks, whereby detection of landmarks by image processing can be performed with ease and stability, and thus accurate registration can be achieved.

As for methods of detecting markers when markers based on colors, for example, a method in which the marker is photographed under a certain illuminating environment, and a representative color of the marker area in the image is extracted and stored, thereby detecting the marker as an area having a color (or its proximate color) same as the representative color of the marker area in the photographed image is known. Also, as for methods of detecting markers when markers based on patterns, for example, each marker is photographed under a certain illuminating environment, and the proximate area of the marker in the image is stored as a template image, whereby the marker can be detected through template matching. That is, similarity is computed between the template image and the partial area of the photographed image to detect the position of the partial area most similar to the template image as the position of the marker. Herein, image characteristics that are used as clues to detect markers such as the representative colors of the marker area and the template image as described above are generically referred to as "detection parameters".

On the other hand, needs for MR systems based on outdoor uses are also increased including, for example, cases where the virtual image of a guide is displayed on the HMD to give a tour of a college site and a tourist attraction.

In the outdoors, it is often difficult to place a man-made marker in an environment. As for methods of measuring the viewpoint position and posture of the observer under these situations, methods in which points having features capable of being detected through image processing (for example, corners of structures, points with large quantity of texture in the structure, points with hues locally changed) in the photographed image photographed by the camera are used as landmarks are known. For detecting the landmark from the photographed image, a template matching technique can be applied.

However, in the outdoor environment, how the landmark is viewed (brightness and hues) is changed due to changes in environmental light by weather (clear/cloudy/rainy) and time periods (morning/daytime/evening). Thus, there is a disadvantage that when detection of landmarks by template matching is performed, correct matching is not carried out due to changes in environmental light, making it impossible to detect landmarks even if the template image for matching is prepared in advance as the detection parameter. Hence, the problem of being unable to obtain correct viewpoint positions and postures and thus making it impossible to perform correct registration between the real image and the virtual image arises. Also, even when the man-made marker is used in the indoor environment, a similar problem arises in the case where the illuminating environment changes.

SUMMARY OF THE INVENTION

The present invention has been devised in view of the aforementioned problems, and its object is to ensure that specific points can be detected from within the photographed image even if the environment during shooting is changed to cause changes in how the landmarks and the like for use as specific points are viewed.

A specific point detecting device according to the present invention for achieving the aforementioned object has, for example, a configuration as described below.

That is, the specific point detecting device for detecting one or more points in a target image, comprises:

updating means for updating detection parameters to detect the above described specific points in such a way as to follow changes in how the above described specific points on the above described target image are viewed, and detecting means for detecting the positions of the above described specific points on the above described target image based on the detection parameters updated by the above described updating means.

Also, preferably, the above described target image is a first image photographed by first photographing means that is movable, and the above described specific points are static specific points in a real space.

Also, a specific point detecting method according to the present invention for achieving the aforementioned object comprises, for example, steps as described below.

That is, the specific point detecting method of detecting one or more points in a target image, comprises:

the updating step of updating detection parameters to detect the above described specific points in such a way as to follow changes in how the above described specific points on the above described target image are viewed, and the detecting step of detecting the positions of the above described specific points on the above described target image, based on the detection parameters updated in the above described updating step.

Also, preferably, the above described target image is a first image photographed in a first photographing step, which is photographed by first photographing means that is movable, and the above described specific points are static specific points in a real space.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13B shows an example of data configuration of the template image;

FIG. 16 illustrates a storage state of the template image in the third embodiment.

DETAILED DESCRIPTION OF THE PREFERRED EMBODIMENTS

Preferred embodiments of the present invention will now be described in detail in accordance with the accompanying drawings.

[First Embodiment]

In an embodiment described below, a template image for use in template matching is used as a detection parameter and this template image is updated dynamically, thereby improving the accuracy of detecting landmarks.

Figure 1:
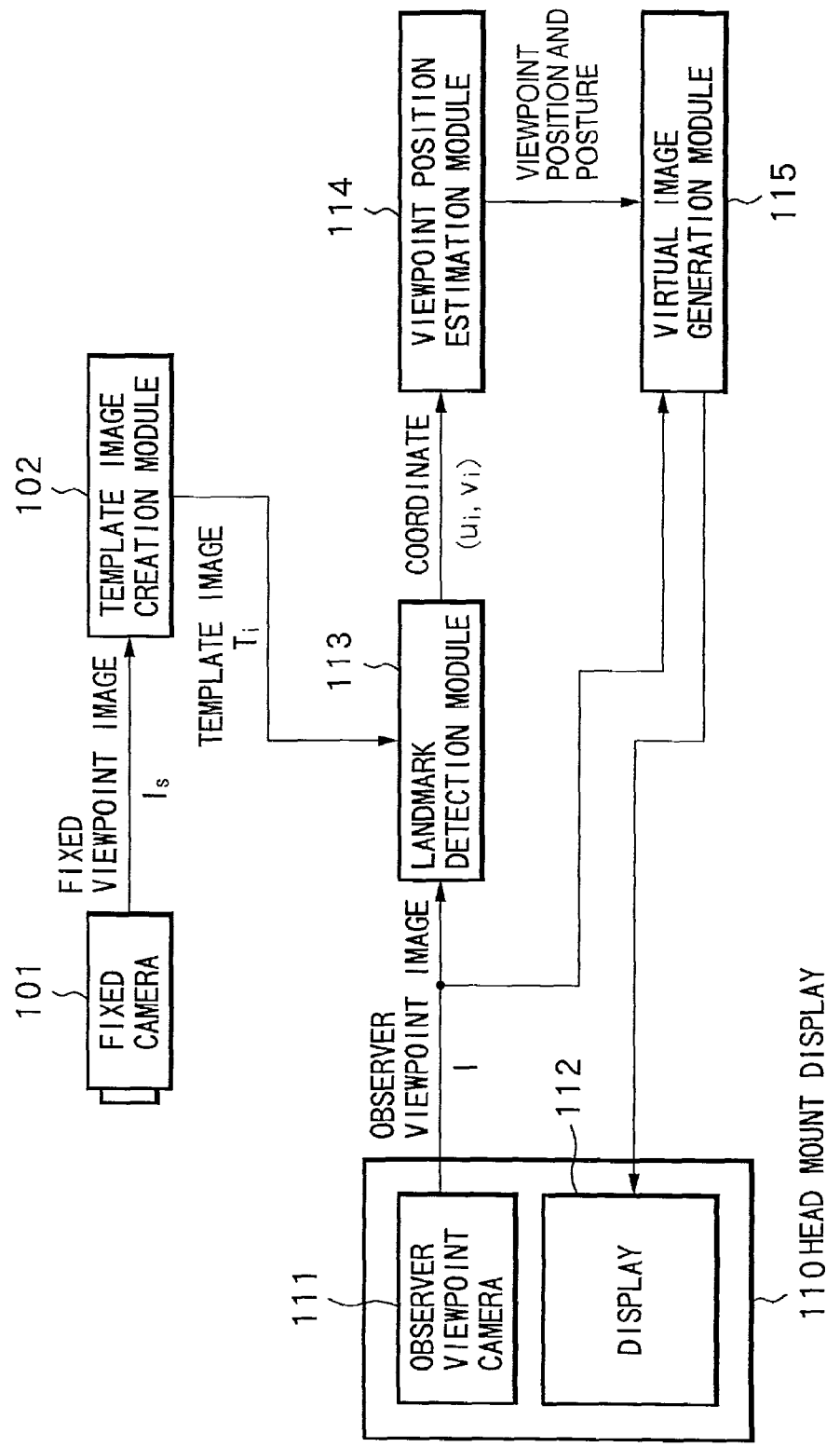
FIG. 1 is a block diagram illustrating a configuration of a MR system according to a first embodiment.

FIG. 1 is a block diagram illustrating a configuration of a MR system according to a first embodiment. In FIG. 1, reference numeral 101 denotes a fixed camera corresponding to second photographing means of the present invention, in which its placement position, the posture of the viewpoint, the focus distance and the like are fixed so that the same point in the scene is displayed one every occasion. That is, on a photographed image (hereinafter referred to as fixed viewpoint image $I_s$) obtained from the fixed camera 101, the landmark $P_i$ (i denotes 1 to the number of landmarks) to be detected is photographed at the same coordinate $(x_i, y_i)$ on every occasion.

Reference numeral 102 denotes a template image creation module, which generates a template image $T_i$ corresponding to each landmark $P_i$ from the fixed viewpoint image $I_s$. While methods of generating template images include a variety of methods as described later, this embodiment is based on the assumption that the observance coordinate $(x_i, y_i)$ of the landmark $P_i$ is known. Also, a template image $T_i$ is generated by extracting from $I_s$ a short distance $R_i$ of specific range centered on the $(x_i, y_i)$. This template image $T_i$ is used in template matching processing for detecting landmarks as described later. Furthermore, this template image $T_i$ is updated in predetermined timing, for example, for each frame of the fixed camera 101.

Reference numeral 110 denotes a HMD wore by an observer, which comprises an observer viewpoint camera 111 and a display 112. The observer viewpoint camera 111 is fixed to the HMD 110, and its photographed image is an image corresponding to the position of viewpoint and the direction of the observer (hereinafter referred to as observer viewpoint image I). Here, the observer camera 111 corresponds to one aspect of first photographing means, and this observer viewpoint image corresponds to an object image for detection of specific points (landmarks).

Reference numeral 113 denotes a landmark detection module, which uses the template image Ti provided from the template image creation module 102 to perform seek processing through template matching, thereby detecting the landmark Pi from the observer viewpoint image I provided from the observer viewpoint camera 111. Since the template image creation module 102 updates the template image in predetermined timing as described above, the landmark detection module can perform template matching using a template image photographed at a time almost same as the observer viewpoint image I (that is, photographed under a light source environment almost same as the observer viewpoint image I). Therefore, even under situations in which the light source environment is dynamically changed as in the case of outdoor environments, stable template matching can be performed on every occasion, and thus correct detection of the landmark position can be achieved.

Furthermore, the landmark detection module 113 determines a coordinate value $(u_i, v_i)$ on the observer viewpoint image I, and sends the same to a viewpoint position estimation module 114. Furthermore, the $(u_i, v_i)$ is the central position of an area matching the template image.

The viewpoint position estimation module 114 determines the viewpoint position and posture of the observer with a known method, based on image coordinate values of two or more landmarks provided from the landmark detection module 113 and the position of the landmark in the real space, measured in advance and retained as known information. Furthermore, theoretically, if coordinate values of landmarks of three points on the observer viewpoint image I, the viewpoint position and posture of the observer viewpoint image can be determined.

The viewpoint position and posture determined as described above are provided to a virtual image creation module 115. The virtual image creation module 115 renders on the observer viewpoint image I in a superimposed manner a virtual image that would be observed from the viewpoint position and posture provided from the viewpoint position estimation module 114, and displays the virtual image on the display 112 of the HMD 110. As a result thereof, a MR image in which the real space and the virtual image are merged is displayed on the display 112, and the observer observes the MR image.

Furthermore, assuming that the observer moves in the outdoors, a unit (fixed unit) including the fixed camera 101 and the template image creation module 102 and a unit (unit that is wore by the observer) including the HMD 110 and the landmark detection module 113 are preferably different units. In this case, transmission of the template image from the template image creation module 102 to the landmark detection module 113 is performed with a cable or wirelessly.

Figure 2:
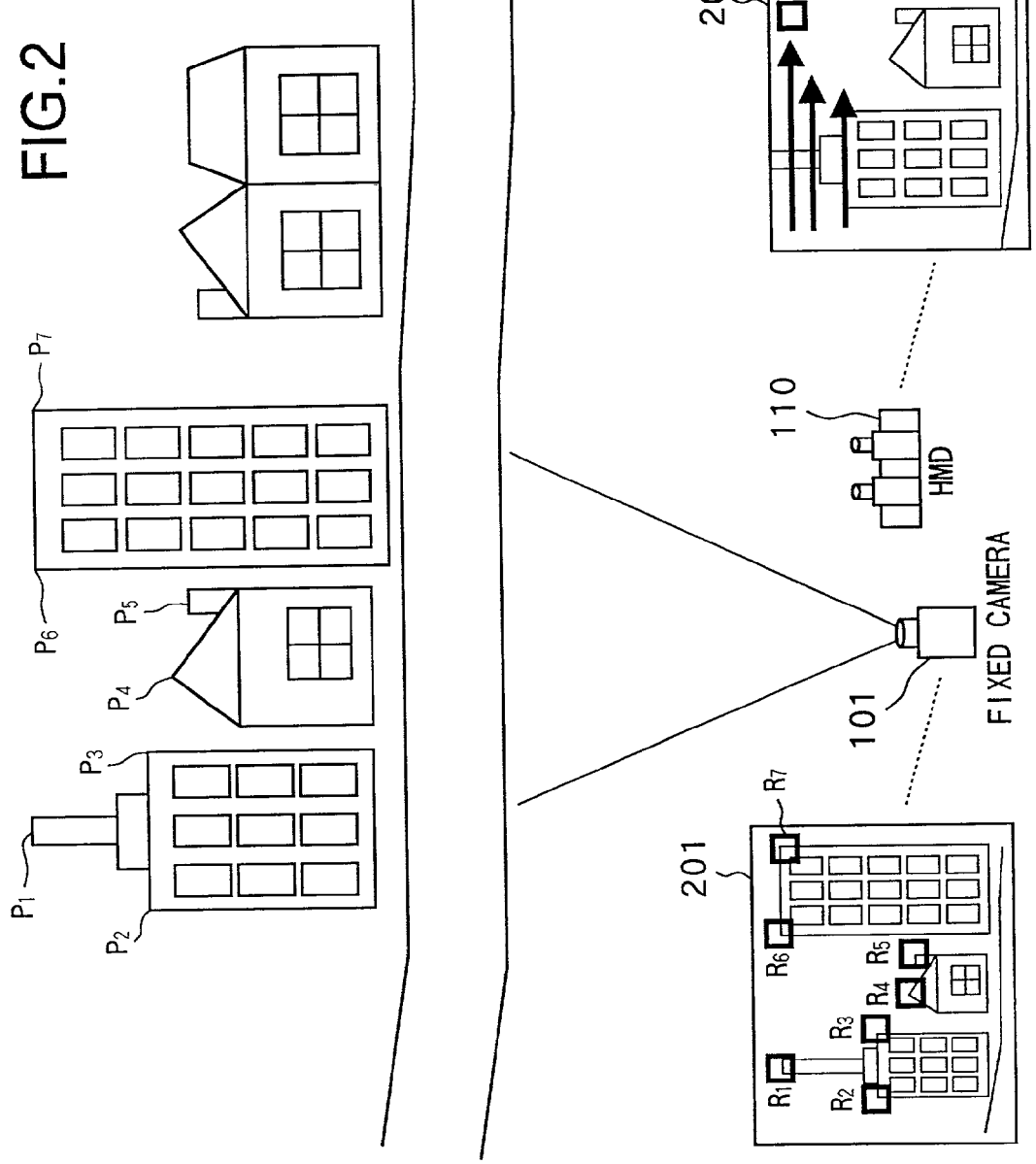
FIG. 2 illustrates an outline of landmark detection processing according to the first embodiment.

FIG. 2 illustrates an outline of landmark detection processing according to the first embodiment. Reference numeral 201 denotes a fixed viewpoint image $I_s$ photographed by the fixed camera 101, for which seven landmarks ($P_1$ to $P_7$) are defined in the case of this example. As described before, the landmark position $(x_i, y_i)$ in the fixed viewpoint image 201 is known. Therefore, the template image creation module 102 extracts predetermined areas $R_1$ to $R_7$ centered on the respective landmark position $(x_i, y_i)$ in the fixed viewpoint image 201, whereby template images $T_1$ to $T_7$ can be generated. In this way, the template image creation module 102 generates the template image $T_i$ in predetermined timing using the latest fixed viewpoint image $I_s$.

The landmark detection module 113 subjects to template matching the observer viewpoint image I (202) obtained from the observer viewpoint camera 111 which the HMD 110 comprises to detect the landmark, using the latest template image $T_i$ generated as described above.

Figure 3:
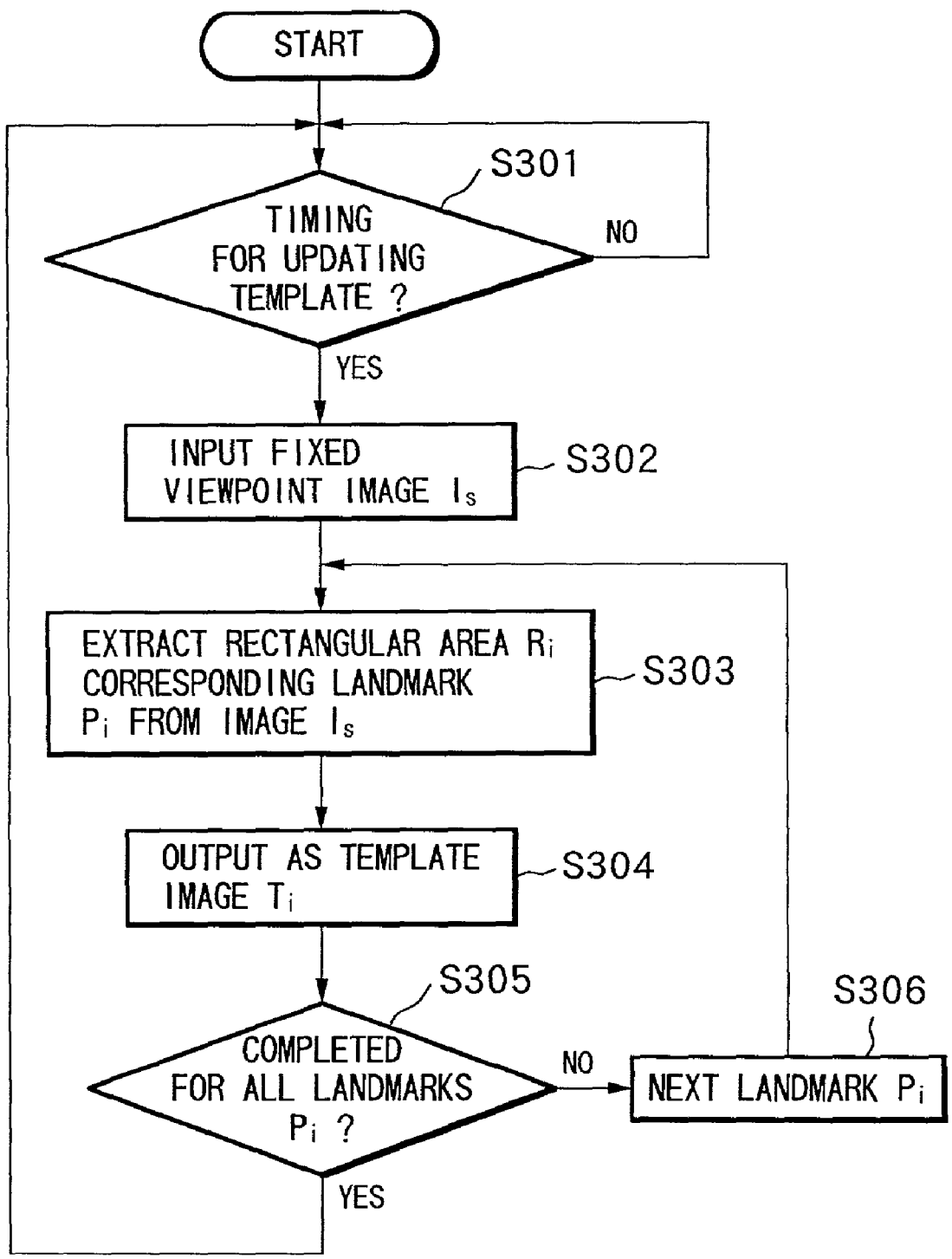
FIG. 3 is a flowchart illustrating a procedure of template image creation processing by a template image creation module 102.

FIG. 3 is a flowchart illustrating a procedure of template image creation processing by the template image creation module 102. First, in Step S301, whether or not timing for updating the template image is determined. In this embodiment, timing for updating the template image is made to match the frame cycle of the fixed camera 101, which is not limiting as a matter of course. It will be apparent that a variety of alterations are possible, such as performing update of the template image each time a predetermined time elapses, performing update of the template image each time the fixed camera 101 finishes photographing a predetermined number of pictures, performing update of the template image when a difference in average intensity values between the fixed viewpoint image of the previously updated template image and the current fixed viewpoint image reaches a predetermined value or greater, or a combination of these timings.

In Step S301, if timing for updating the template image, advancement to Step S302 is made, the fixed viewpoint image $I_s$ from the fixed viewpoint camera 101 is inputted. Then, in Step S303, an image of predetermined rectangular area $R_i$ corresponding to the landmark $P_i$ (for example, $(x, y)$ that satisfies $(x_i-n<x<x_i+n, y_i-n<y<y_i+n;$ n is a constant)) is extracted out of the image $I_s$, and is defined as the template image $T_i$. In Step S 304, the template image $T_i$ obtained in Step S303 is outputted to the landmark detection module 113.

In Step S305, whether generation of the template image is completed for all the landmark Pi is determined, and if there are landmarks that have not been processed yet, shift of those landmarks to objects to be processed is made in Step S306, and a return to Step S303 is made to repeat the above described processing. If generation and output of the template image is completed for all the landmarks, processing is returned from Step S305 to Step S301 to await next update timing.

Through processing described above, the template image updated in predetermined timing (in this embodiment, on a frame-by-frame basis) is provided to the landmark detection module 113.

Furthermore, in the aforementioned processing, the rectangular area $R_i$ extracted from the image $I_s$ is defined as the template image $T_i$ directly in Step S303, but methods of generating template images are not limited thereto. For example, a plurality of rectangular areas $R_i$ extracted previously from the fixed viewpoint image $I_s$ in a plurality of frames is used to create an average image or weighted average image thereof and the image may be defined as the template image $T_i$. In this case, it can be expected that noise elements included in the fixed viewpoint image $I_s$ are removed.

Also, in the aforementioned embodiment, all the template images generated in step S303 are outputted in Step S304, but methods of outputting the template image are not limited thereto. For example, a degree of difference e between the finally outputted template image $T_i'$ and the template image $T_i$ generated in Step S303 is calculated, and only when the degree of difference is greater than or equal to a specified value ($e \geq TH_1$), the template image may be outputted, determining that the light source environment is changed. In this case, send of unnecessary data is omitted, whereby traffic of the network can be reduced. Also, when the degree of difference is greater than or equal to a specified value ($e \geq TH_2$), it may be concluded that the template image won't be outputted, determining that the landmark is concealed, in order to prevent situations in which the template image is updated to an erroneous image obtained by photographing a barrier in the case where there exists a barrier between the landmark and the fixed camera 101 and thus the landmark is not observed on the fixed viewpoint image $I_s$. Furthermore, the degree of difference between template images can be calculated using known image processing methodologies such as cross relation and summation of differential absolutes of pixel values.

Figure 4:
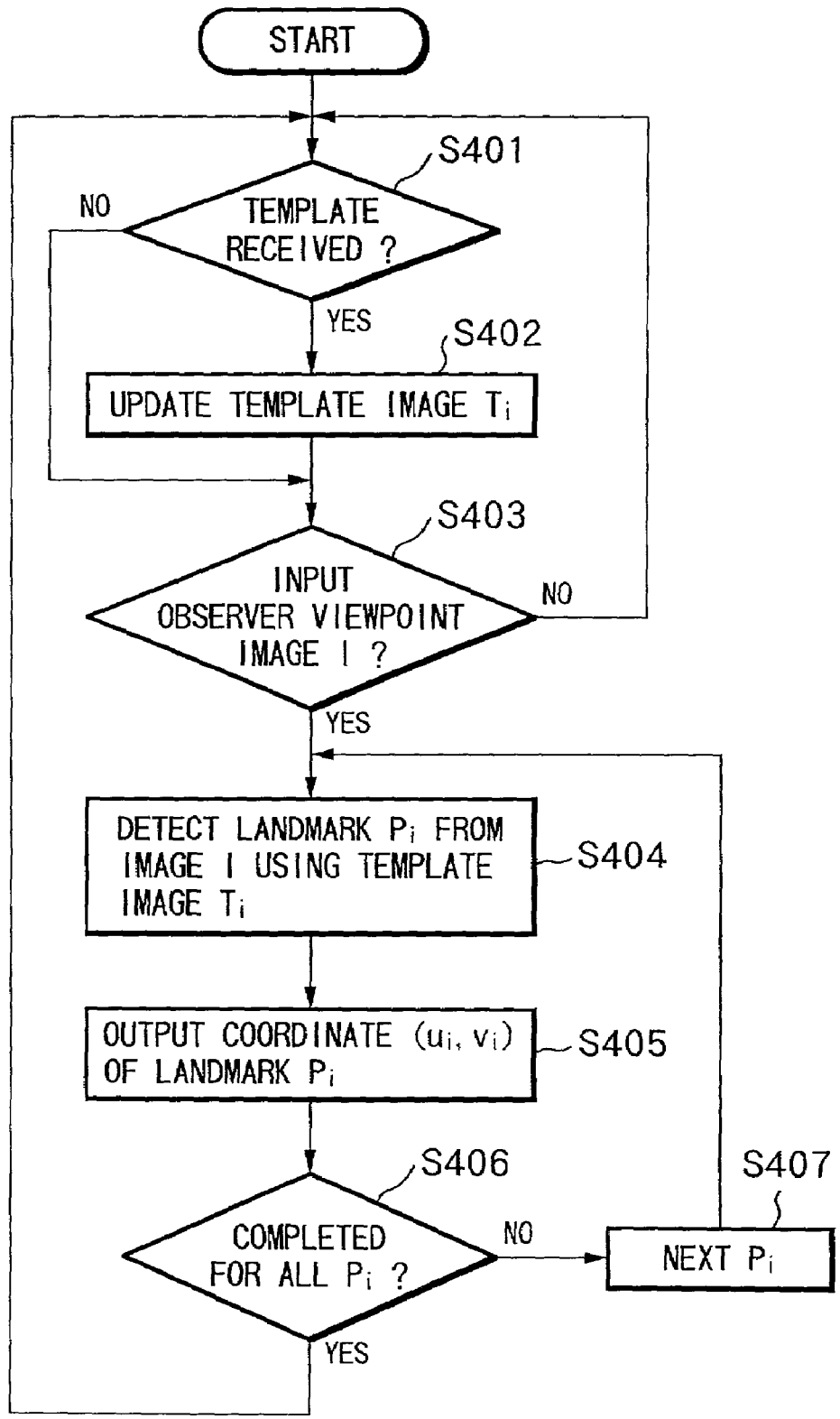
FIG. 4 is a flowchart illustrating a procedure of detecting landmarks by a landmark detection module.

Processing by the landmark detection module 113 will be now described. FIG. 4 is a flowchart illustrating a procedure of detecting the landmark by the landmark detection module.

Steps S401 and S402 refer to processing of storing in a memory the template image Ti for use in template matching when the template image Ti is outputted from the aforementioned template image creation module 102. Furthermore, in this embodiment, because each time one template image is obtained, the template image is outputted (Steps S303, S304) as in the aforementioned FIG. 3, update of the template image in Steps S401 and S402 is performed for each template image. However, the update procedure of the template image is not limited thereto. For example, if in the template image creation module 102, generation of template images for all the landmarks included in the fixed viewpoint image $I_s$ is completed and then those template images are outputted in a batch, all the template images are updated in a batch in the landmark detection module 113.

If the template image is not received in Step S401, or after Step S402 is ended, processing goes to Step S403, in which whether or not the observer viewpoint image I is inputted is determined. As described above, the observer viewpoint image I is image data outputted from the observer viewpoint camera 111, and the landmark is detected from this observer viewpoint image I by processing of Steps S404 to S407. Thus, in this embodiment, detection of landmark is performed each time the observer viewpoint image is inputted from the observer viewpoint camera 111 (namely, for each frame).

In Step S404, the template image $T_i$ is used to detect the landmark $P_i$ from the observer viewpoint image I. For this detection processing, any known methodology for template matching may be used. For example, for each pixel $(u_j, v_j)$ in the observer viewpoint image I, an area that is identical in size to the template image $T_i$ is extracted as a partial image $Q_j$, with the pixel being centered, and the degree of difference $e_j$ is calculated between the partial image $Q_j$ and the template image $T_i$. For methods of calculating the degree of difference, cross relation between both images may be determined and the sum of absolutes of differentials in intensity values between corresponding pixels may be used, and in the case where the input image is a color image, the sum of RGB distances between corresponding pixels may be used. The degree of difference $e_j$ between the partial image $Q_j$ and the template image Ti is determined for all the pixel $(u_j, v_j)$ in the observer viewpoint image I, and the pixel whose degree of difference $e_j$ is the smallest (namely, the central coordinate $(u_j, v_j)$ of the partial image $Q_j$ in best agreement with the template image $T_i$) is defined as the detection position $(u_i, v_i)$ for the landmark Pi in the observer viewpoint image I.

In Step S405, the coordinate $(u_i, v_i)$ is outputted to the viewpoint position estimation module 114, as the detection position for the landmark $P_i$ in the observer viewpoint image I. Furthermore, in Step S404, if it is determined that there is no part in the observer viewpoint image I that matches the template image $T_i$ (for example, if all the degree of difference $e_j$ exceeds a defined threshold), information indicating that the landmark $P_i$ does not exist on the observer viewpoint image I is outputted, or this processing is skipped. In Step S406, whether or not detection processing has been completed for all the landmarks $P_i$ is determined. If there exist landmarks that have not been processed yet, advancement to Step S407 is made to repeat processing from Step S404, with the not-yet-processed landmarks $P_i$ being objects to be detected. When processing is completed for all the landmarks $P_i$, a return to Step S401 is made.

Furthermore, the template image creation module 102 and the landmark detection module 113 are operated in synchronization with each other, whereby the effect of the present invention is further enhanced. That is, after the template image is received in Step S401, the fixed viewpoint image $I_s$ from which the received template image originates and the observer viewpoint image I photographed at the same time are inputted in Step S403, thereby enabling template matching using the template image photographed under a same light source environment as the observer viewpoint image I. For achieving this processing accurately, it is desirable that shooting by the fixed camera 101 is electrically synchronized with shooting by the observer viewpoint camera 111, as a matter of course.

Furthermore, in the aforementioned embodiment, detection processing is performed for all the landmarks, but processing may be ended at the time when a predetermined number of landmarks enabling calculation of the observer viewpoint position.

Furthermore, in the aforementioned processing, the template image creation module 102 outputs the updated template image, thereby performing update of the template image in the landmark detection module 113, but the landmark detection module 113 may read the latest template image stored in the image creation module 102 as necessary. For the timing in which the image is read, for example, it is read each time the observer viewpoint image I is inputted or at a predetermined time interval. In this case, the template image creation module 102 retains the template image created in its own medium, and upon request from the landmark detection module 113, the latest template image is sent from the template image creation module 102 to the landmark detection module 113.

Also, in the aforementioned Step S404, the entire observer viewpoint image I is scanned to detect the landmark Pi, but it is possible to apply a variety of known methodologies to ensure efficiency of template matching processing. One example is as follows.

Figure 5B:
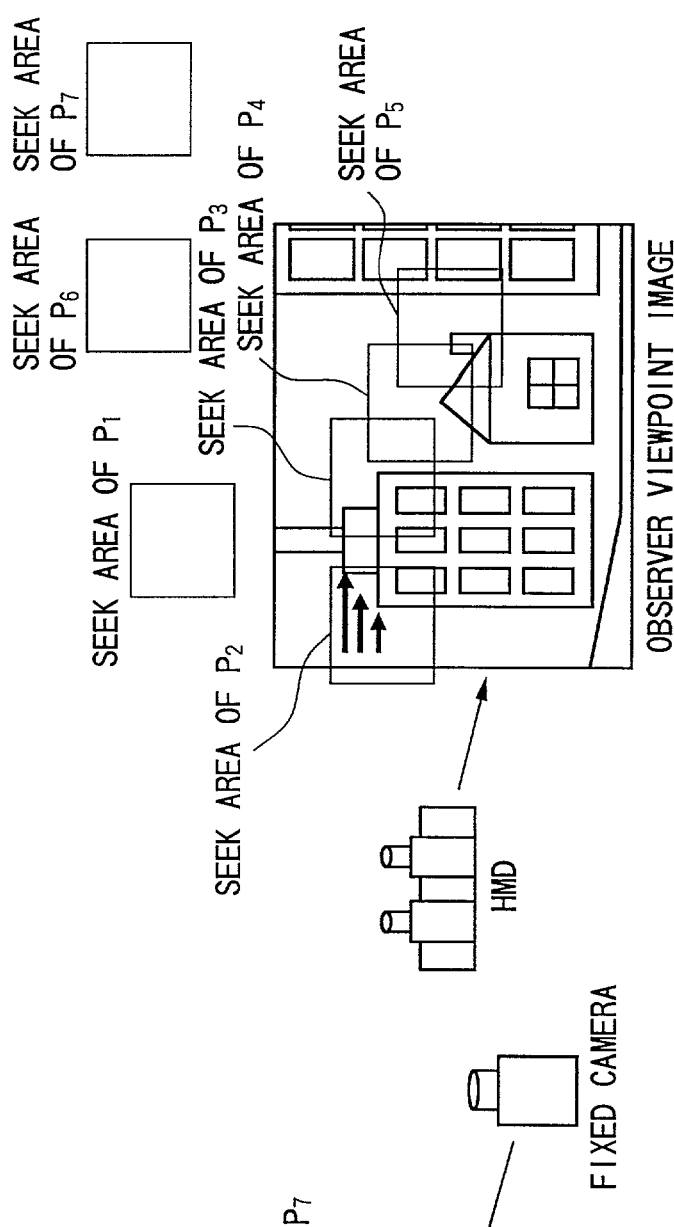
FIGS. 5A and 5B illustrate a method of limiting seek areas during landmark detection processing.
Figure 5A:
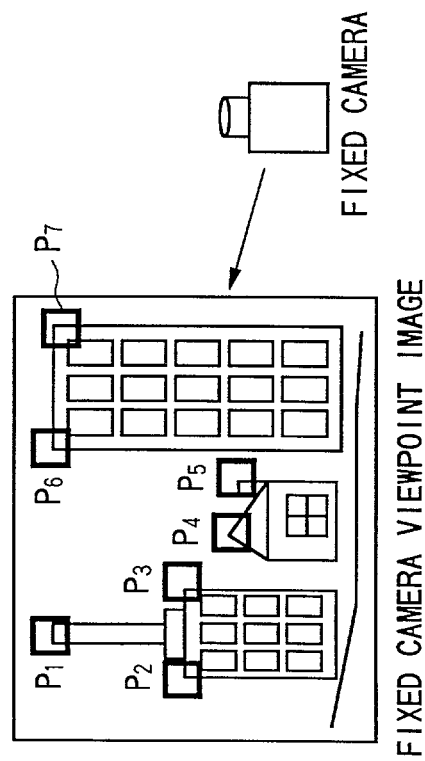

FIGS. 5A and 5B illustrate a method of limiting the seek area during landmark detection processing. Information of the position and posture of the observer camera in the previous frame (or the past frame) of the observer viewpoint image I, the detection position for the landmark in the previous frame (or the past frame), and so on is used to estimate an approximate position in the observer viewpoint image I of the current frame for each landmark and define a seek area in the peripheral area. Of course, position data by the immediate preceding viewpoint position estimation module 114 may be used. Then, only for the landmark $P_i$ whose seek area is included in the observer viewpoint image I of the current frame, seek processing in the seek area is performed. For illustration with the example in FIGS. 5A and 5B, assume that respective seek areas for landmarks $P_1$ to $P_7$ shown in FIG. 5A are determined as shown in FIG. 5B for the observer viewpoint image I. In this case, in step S404, seek of the corresponding landmarks is performed for all the seek areas of $P_3$ to $P_5$ and part of the seek area of $P_2$ included in the observer viewpoint image I. In other words, speedy processing is achieved by narrowing seek ranges.

As described above, according to the first embodiment, because update of the template image is performed using an image photographed by the fixed camera 101, it is possible to respond to changes in the environment to obtain a template image corresponding with the environment. For this reason, the landmark can be certainly detected from the observer viewpoint image I irrespective of changes in the environment, thus making it possible to determine correctly the viewpoint position and posture of the observer in the outdoor environments. Accordingly, it is suitable as registration between the real space and the virtual space, especially in the case where the MR image is displayed on the display 112 which the HMD 110 comprises.

Furthermore, in this embodiment, assume that the position of each landmark in the fixed viewpoint image 201 is known, is retained, for example, in a memory (not shown) of the template image creation module, is obtained as necessary, and is supplied to the template image creation module 102. For means for supplying the position of the landmark like this, in addition thereto, the following methods may be used. That is, an operator may specify the position of the landmark on the fixed viewpoint image 201 through inputting means (not shown), or the position of each landmark in the three-dimensional space measured by some method and camera parameters of the fixed camera 101 (including at least position and postures) may be retained in the memory for calculating based on this information the position of each landmark on the fixed viewpoint image 201 by landmark position calculating means (not shown) (corresponding to the position-of-specific point calculating means). Also, in the case of applications in which landmarks to be detected are not defined in advance, and some feature points in the observer image 202 are merely tracked, a feature point having a remarkable image feature (for example, edge portion and highly textured portion) may be automatically extracted from on the fixed viewpoint image 201 by feature extracting means (not shown) at an initial time, and the position thereof may be defined as the position of the landmark.

[Second Embodiment]

In the aforementioned first embodiment, since update of the template image is performed with one fixed camera, the range of acquirement of the template image is limited, and thus the range in which the observer moves and/or looks around is limited. Then, in a second embodiment, a plurality of fixed cameras is placed for allowing the observer to move and/or look around. Because a plurality of fixed cameras is used, however, there are cases where a plurality of template images exists for one landmark (hereinafter referred to as cases where overlap exists) and cases where one fixed camera is assigned to one landmark, whereby only one template image exists (referred to as cases where no overlap exists). In the second embodiment, cases where no overlap exists will be described, and cases where overlap exists will be described in a third embodiment.

Figure 6:
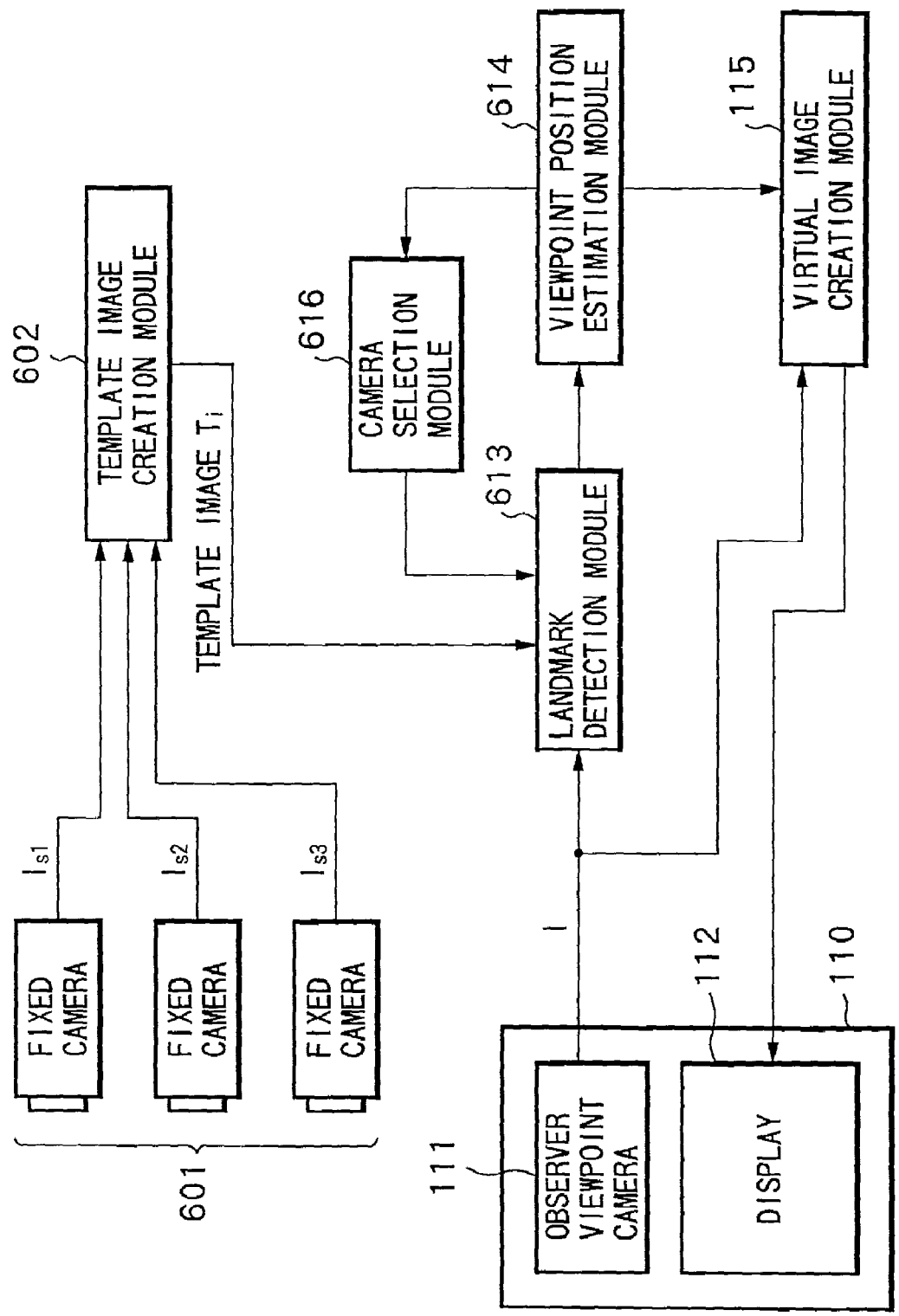
FIG. 6 is a block diagram showing a configuration of the MR system according to a second embodiment.

In the case where no overlap exists, the MR system provided with a plurality of fixed cameras can be achieved with a configuration similar to that of the first embodiment. FIG. 6 is a block diagram showing the configuration of the MR system according to the second embodiment. That is, a template image creation module 602 extracts, from a plurality of fixed viewpoint images obtained from a plurality of fixed cameras 601, data of areas Ri predetermined for each thereof, and outputs the data as template images Ti.

As in the case of the first embodiment, a landmark detection module 613 updates a template image to be used with a template image sent from the template image creation module 602, and uses this template image to perform detection of landmarks from the observer viewpoint image I. A camera selection module 616 selects a predetermined number of fixed cameras positioned near viewpoint positions obtained from a viewpoint position estimation module 614, and notifies the landmark detection module 613 of the selection result. As will be described later, in the second embodiment, which fixed camera the camera selection module 616 uses a template image from is determined, based on the viewpoint position outputted from the viewpoint position estimation module 614, in order to improve processing efficiency. Then, using the template image from the determined fixed camera, the landmark detection module 613 performs template matching for detection of landmarks.

The virtual image generation module 115 and the HMD 110 are same as those described in the first embodiment.

Figure 7:
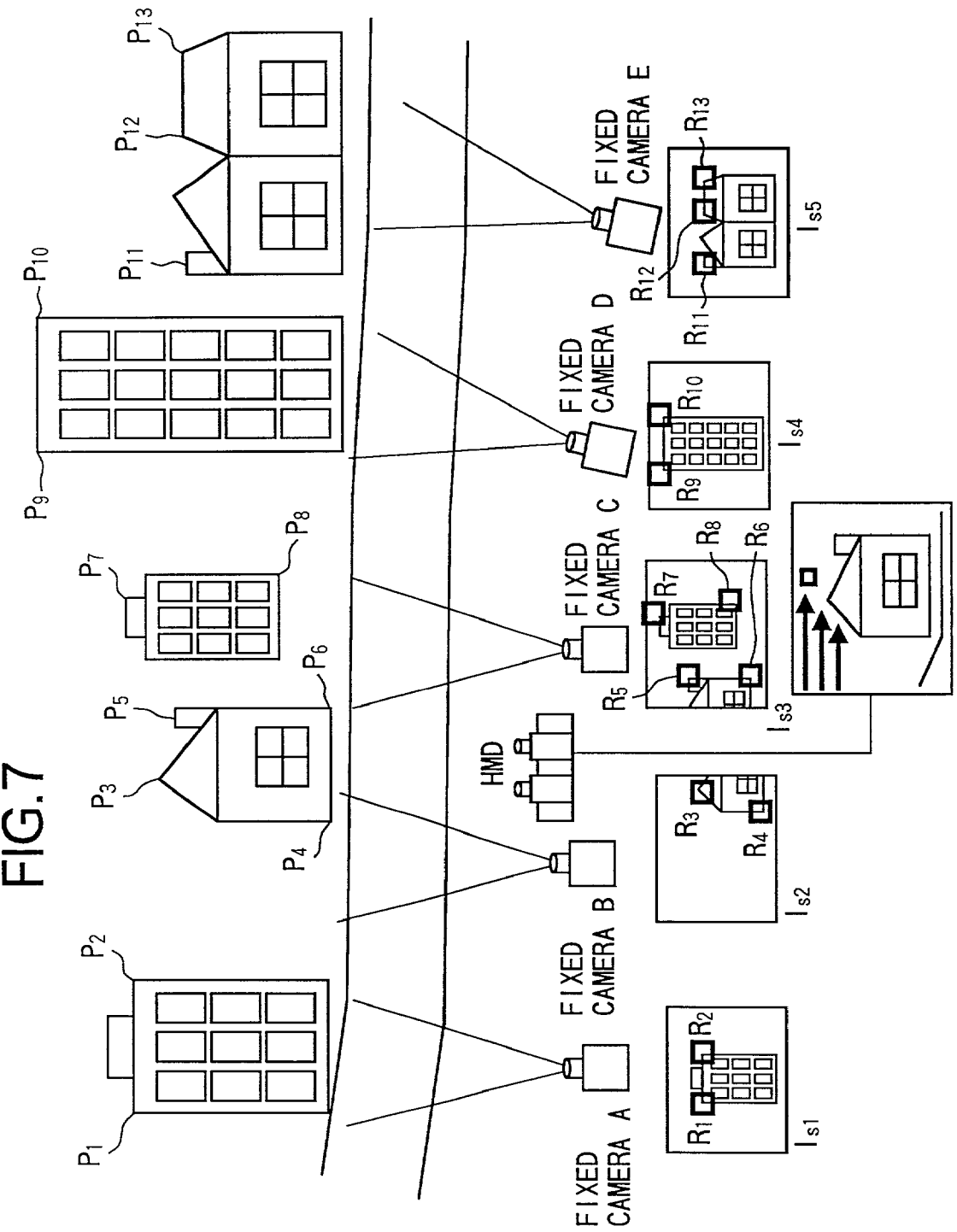
FIG. 7 illustrates an outline of landmark detection processing according to the second embodiment.
Figure 8:
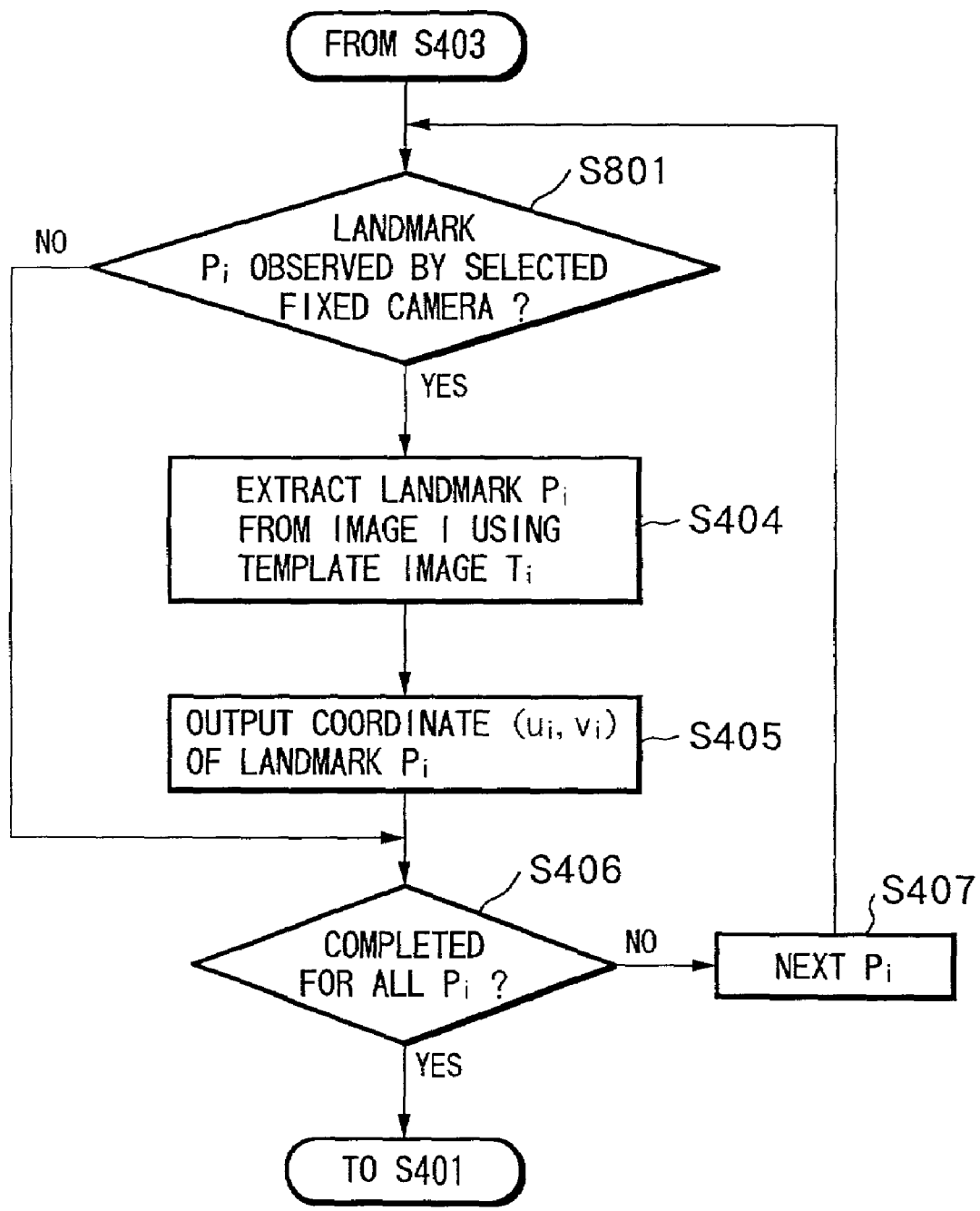
FIG. 8 is a flowchart illustrating processing when the limiting of landmarks to be detected is performed, in the second embodiment.

FIG. 7 illustrates an outline of landmark detection processing according to the second embodiment. Observation positions of landmarks $P_1$ to $P_{13}$ on respective fixed viewpoint images $I_{s1}$ to $I_{s5}$ obtained by a plurality of fixed cameras 601 (A to E) are defined, and rectangular areas $R_1$ to $R_{13}$ on the peripheral thereof are extracted to generate template images $T_1$ to $T_{13}$ corresponding each thereof. Then, the landmark is merely detected from the observer viewpoint image I using those template images. Processing in this case is similar essentially to processing in the case of one fixed camera, allowing one to consider it as the case where the image angle of one camera is just widened, and thus detection of landmarks can be performed by the processing procedures with FIGS. 3 and 4.

As described above, also in the second embodiment in which a plurality of fixed cameras is provided, the position and postures of the observer viewpoint by processing similar to that of the first embodiment (namely, even in a configuration in which the camera selection module 616 in FIG. 6 does not exist). However, since there are a large number of landmarks, performing detection processing for all landmarks every time results in reduced processing efficiency. Thus, in the second embodiment, the number of landmarks to be detected in the landmark detection module 613 is limited in advance, thereby improving processing efficiency. That is, landmarks to be detected are narrowed down to just the landmarks observed by the fixed camera selected by the camera selection module 616.

This can be achieved by, for example, adding Step S801 before Step S404 in processing shown in FIG. 4. When the observer viewpoint image I is inputted, processing goes from Step S403 to Step S801, and whether or not the landmarks Pi is observed by the fixed camera selected by the camera selection module 616 is determined. At this time, if the landmark Pi is not observed by the selected fixed camera, processing of detecting the landmark (Step S404, S405) is skipped, and advancement to Step S406 is made to detect a next landmark. On the other hand, if the landmark Pi is observed by the fixed camera, advancement to Step S404 is made to detect the landmark.

Furthermore, also in the second embodiment, various kinds of known methodologies for improving efficiency of processing of template matching can be applied. For example, the methodology of limiting the seek area as described in the first embodiment is also effective. In particular, the seek area is specified after limiting the template image as described above, thereby making it possible to eliminate the need for calculation of the position of unnecessary seek areas, which is effective.

Figure 9:
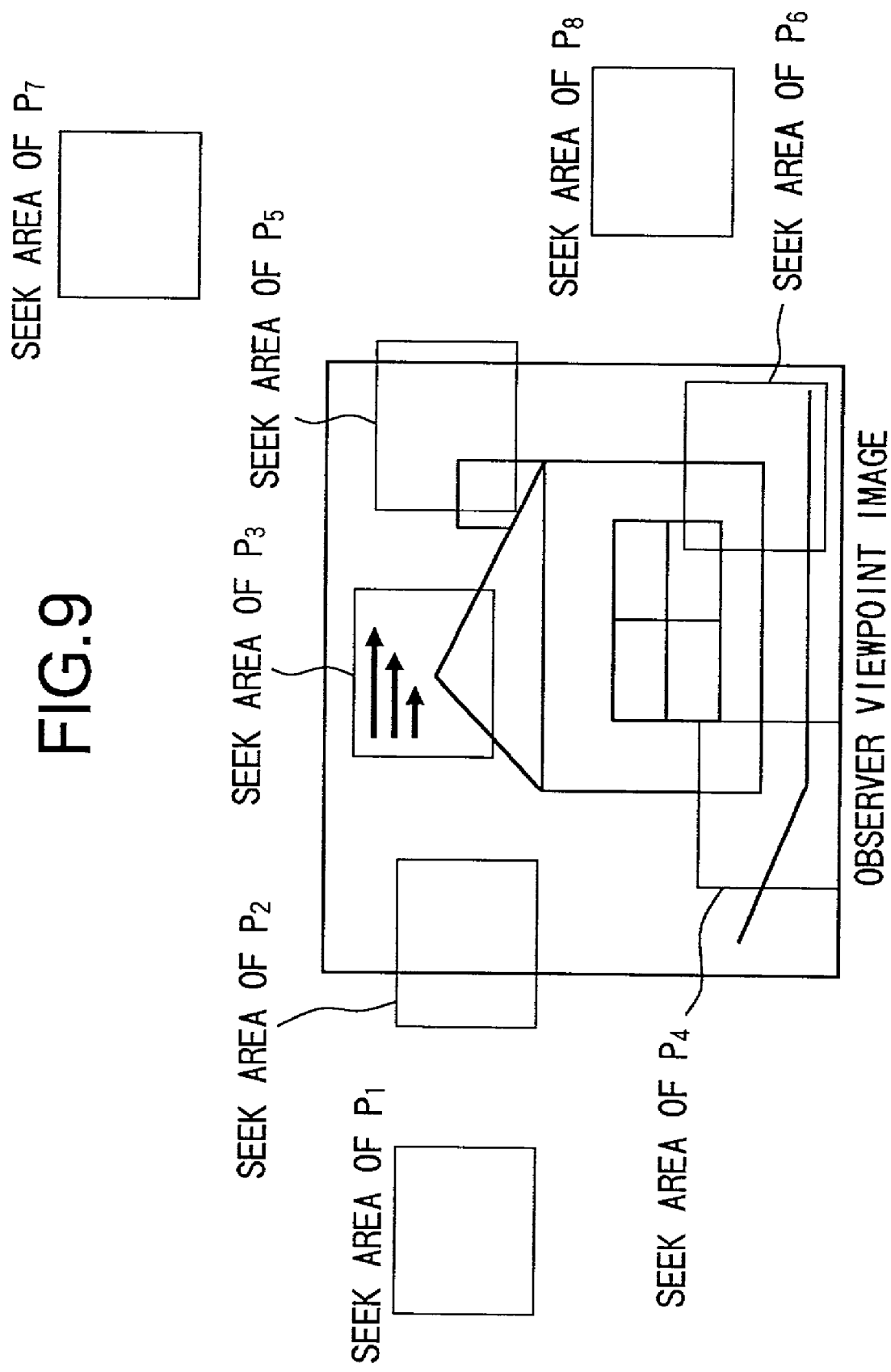
FIG. 9 illustrates a method of limiting seek areas during landmark detection processing, in the second embodiment.

FIG. 9 illustrates a method of limiting the seek area of the template image at the time of landmark detection processing, in the second embodiment for example, the camera selection module 616 selects fixed cameras A, B and C shown in FIG. 7, based on the detected viewpoint position. In this case, it is landmarks $P_1$ to $P_8$ that are to be detected, and other landmarks $P_9$ to $P_{13}$ are not taken into consideration. And, in step S404, landmark detection processing is performed only for those having seek areas included in the observer viewpoint image ($P_2$ to $P_6$ in the figure), of these landmarks $P_1$ to $P_8$, through template matching using corresponding template images $T_2$ to $T_6$.

As described above, according to the second embodiment, a plurality of fixed cameras is used to perform update of the template image, thus allowing the observer to move more widely.

[Third Embodiment]

Cases where a plurality of fixed cameras is provided, and thus a plurality of template images exist for one landmark at the same time, namely cases where overlap exists will be now described.

Figure 10:
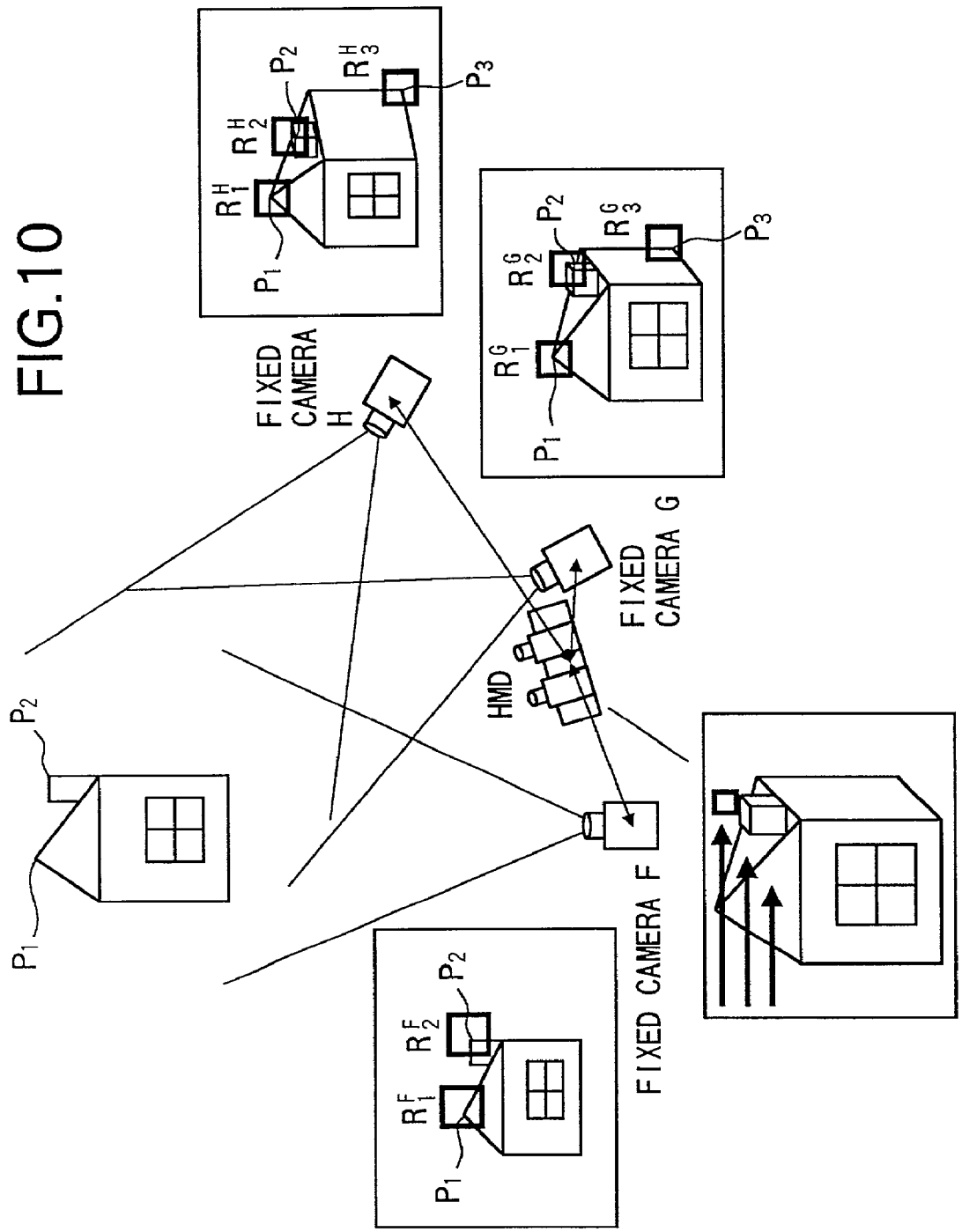
FIG. 10 illustrates an outline of landmark detection processing in the case where overlaps are present, according to a third embodiment.

FIG. 10 illustrates an outline of landmark detection processing in the case where overlap exists, according to a third embodiment. In the fixed camera F, landmarks $P_1$ and $P_2$ are observed, and template images $T_1^F$ and $T_2^F$ are generated through rectangular areas $R_1^F$ and $R_2^F$ defined in the peripheral thereof. Also, in the fixed camera G, landmarks $P_1$ to $P_3$ are observed, and template images $T_1^G$ to $T_3^G$ are generated through rectangular areas $R_1^G$ to $R_3^G$ defined in the peripheral thereof. In a similar way, template images $T_1^H$ to $T_3^H$ are obtained from the fixed camera H. At this time, for example, $T_1^F$, $T_1^G$ and $T_1^H$ are template images corresponding to the same landmark $P_i$ in the space.

In this way, in the case where for one landmark, a plurality of template images is obtained by different fixed cameras, it is necessary to determine which template image is used to detect the landmark. Two cases, namely cases where (1) a template image with the best result of template matching is used and (2) a template image that is obtained by the fixed camera selected on the basis of the observer position is used will be described below. Furthermore, in the third embodiment, for example, template images obtained from photographed images obtained by each of the cameras F, G and H are stored as shown in FIG. 16. For example, template images $T_1^F$ to $T_6^F$ of landmarks $P_1$ to $P_6$, template images $T_3^G$ to $T_8^G$ of landmarks $P_3$ to $P_8$, and template images $T_7^H$ to $T_{12}^H$ of landmarks $P_3$ to $P_8$ are obtained from the photographed images of the camera F, the camera G and the camera H, respectively, and are stored. Here, landmarks having same numerical subscripts are the same landmark. For example, the template image of the landmark $P_6$ is obtained from each photographed image of the Cameras F and G.

(1) The case where a template image with the best result of template matching is used.

Figure 11:
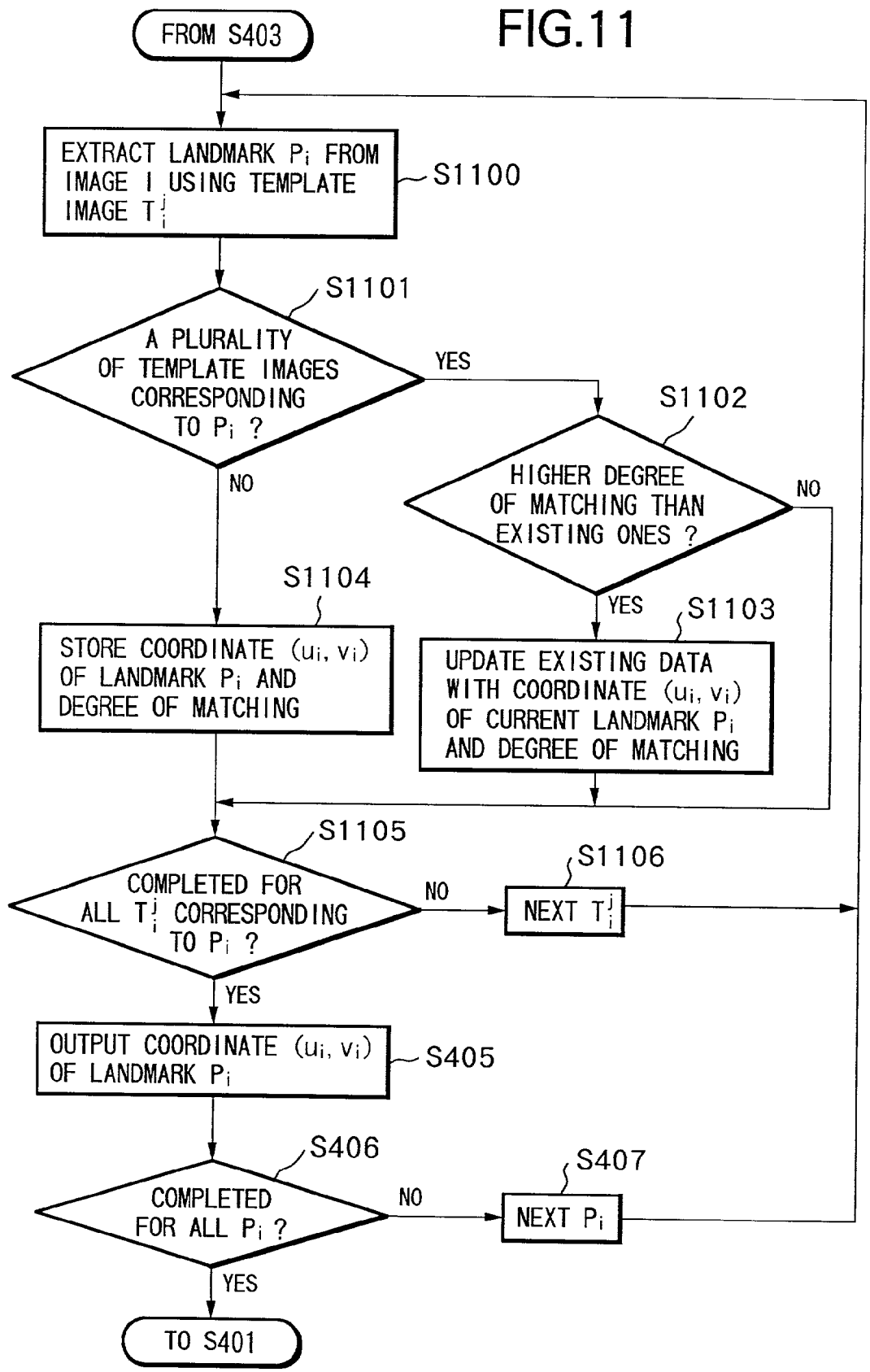
FIG. 11 is a flowchart illustrating a procedure when landmark detection is performed using a template image with the best matching result if there is a plurality of template images for the same landmark.

FIG. 11 is a flowchart illustrating a procedure in the case of performing detection of the landmark using a template image with the best result of template matching, if there exist a plurality of template images for the same landmark. In FIG. 11, a process replacing Step S404 in FIG. 4 is shown.

When in Step S403, the observer viewpoint image I is inputted, the template image $T_i^j$ of the landmark $P_i$ obtained with the fixed camera j is used to detect the landmark $P_i$ from the observer viewpoint image I, in Step S1100. And, in Step S1101, whether or not this landmark $P_i$ has a plurality of template images and a coordinate has been already calculated with other template images is determined. If the coordinate has not been calculated with other template images, or if there is not a plurality of corresponding template images, the coordinate value that is determined with such template images, and its matching degree are stored in the memory, in step S1104.

On the other hand, if the coordinate is already outputted with other template images, advancement to Step S1102 is made, and the result of matching by other template images is compared with the result of matching by current template images. And, if the result of matching by current template images is better (greater in matching degree), advancement to Step S1103 is made, and the coordinate of the landmark stored in the memory is replaced with the coordinate value obtained using current template images and its matching degree. For example, if matching is already performed using $T_6^F$ and its matching degree is stored when matching is performed for $T_6^G$, the matching degree when using $T_6^F$ and the matching degree when using $T_6^F$ are compared with each other, and one greater in matching degree is adopted.

Then, in Step S1105, if processing is not completed for all the template images $T_i^j$ corresponding to the landmark $P_i$, advancement to Step 1106 is made, and processing from S404 is repeated, with not-yet-processed template images $T_i^j$ being objects to be processed. On the other hand, if processing is completed for all the template images $T_i^j$ corresponding to the landmark $P_i$, advancement to Step S405 is made, and the coordinate stored in the memory is outputted to the landmark detection module as the detection position for the landmark $P_i$. Processing is performed for all the template images as described above, whereby the coordinate value with a template image having the best matching degree is adopted if there is a plurality of template images for one landmark.

(2) The case where a template image that is obtained by the fixed camera selected on the basis of the observer position is used.

Figure 12:
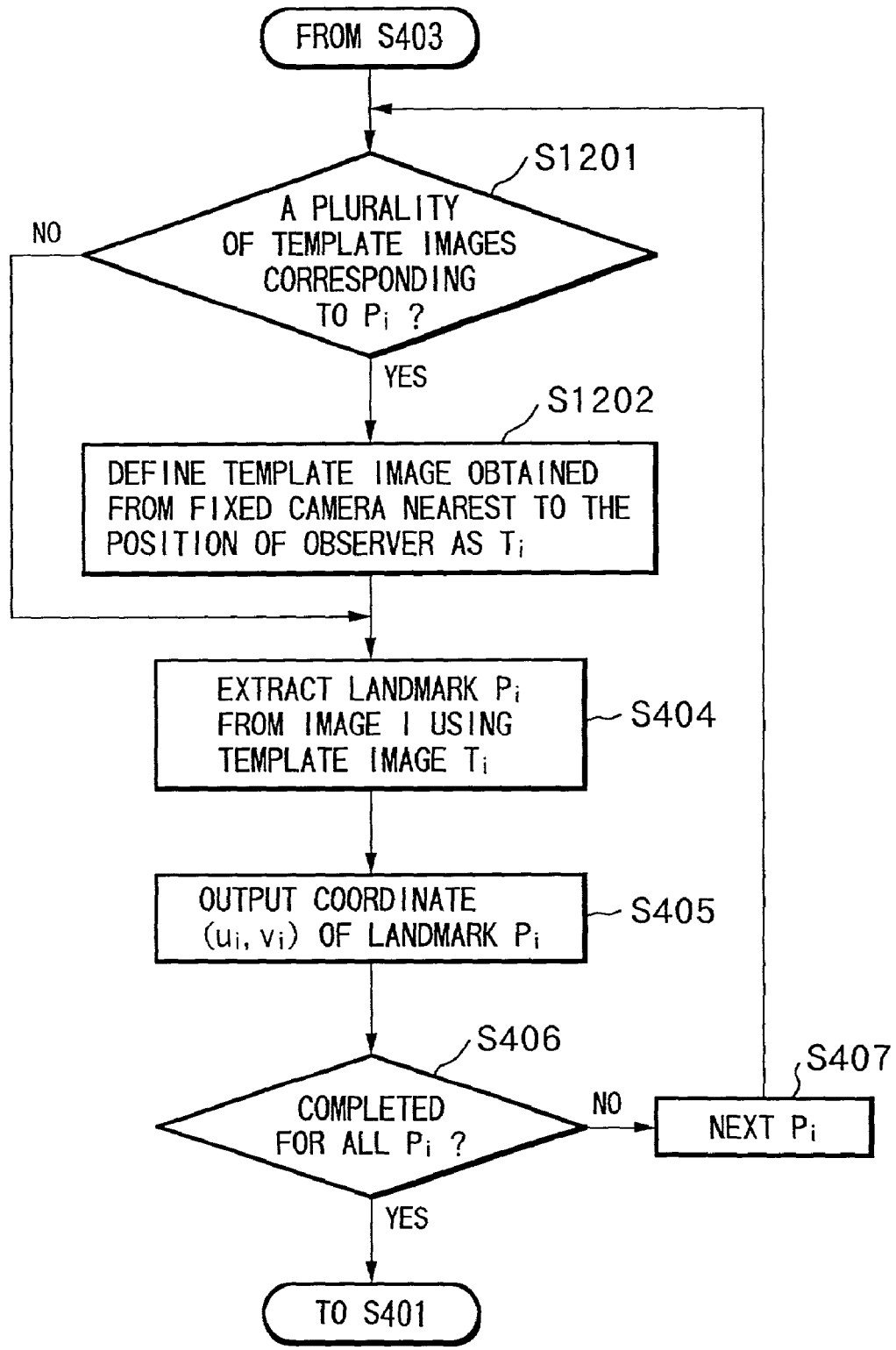
FIG. 12 is a flowchart illustrating a procedure when landmark detection is performed using a template image obtained by a fixed camera selected on the basis of the position of an observer if there is a plurality of template images for the same landmark.

FIG. 12 is a flowchart illustrating a procedure in the case of performing detection of the landmark using a template image obtained by the fixed camera selected on the basis of the observer position, if there is a plurality of template images for the same landmark. In FIG. 12, a process added before Step S404 in FIG. 4 is shown.

When in Step S403, the observer viewpoint image I is inputted, whether or not there is a plurality of template images with respect to the landmark Pi for which detection processing is performed from now on is determined, in Step S1201. If there is not a plurality of template images, because there exist only one template image for the landmark, advancement to Step S404 is made, and detection of the landmark by template matching is performed.

On the other hand, if there is a plurality of template images, a template image obtained from a fixed camera nearest the observer position is selected from such a plurality of template images, and is defined as the template image $T_i$ for use in detection processing, in Step S1202, and advancement to Step S404 is made. For example, in FIG. 16, if the observer position is nearer the camera G than the camera F, template images $T_3^G$ to $T_6^G$ obtained from the image photographed by the camera G are adopted with respect to landmarks $P_3$ to $P_6$.

Processing is performed for all the template images as described above, whereby a template image from a fixed camera nearest to the observer position is adopted to perform detection of the landmark if there is a plurality of template images for one landmark.

As described above, according to the third embodiment, if there is a plurality of template images obtained from a plurality of fixed cameras for one landmark, an appropriate template image can be selected. Particularly, as shown in FIG. 10, since the template image obtained from each of a plurality of fixed viewpoint images obtained by photographing one landmark from different directions can be appropriately used, template matching can be suitably performed even if how the landmark is viewed is significantly varied depending on observing directions (for example, in the case of stereoscopic shapes and reflection properties close to mirror-finished surfaces).

Furthermore, use in combination with the camera selection module 616 as described in the second embodiment is also possible. In this case, landmarks to be subjected to processing described with FIGS. 11 and 12 are limited to only the landmark obtained from the fixed camera selected by the camera selection module 616.

Also, in the third embodiment, a various kinds of known methodologies for improving efficiency of processing of template matching can be applied, as a matter of course.

[Fourth Embodiment]

In first to third embodiments, the template image is created as necessary from the fixed viewpoint image obtained using the fixed camera, thereby updating the template image for use in template matching performed in the landmark detection module 113. According to this methodology, since the image photographed at each point in time is used to generate the template image, how the landmark is viewed at different times is reflected on the template image, thus enabling favorable template matching to be performed. However, one or more fixed cameras must be prepared, resulting in increased scale of devices. Thus, in a fourth embodiment, two or more kinds of template images are previously registered for one landmark, and are used to perform update of template images.

Figure 13A:
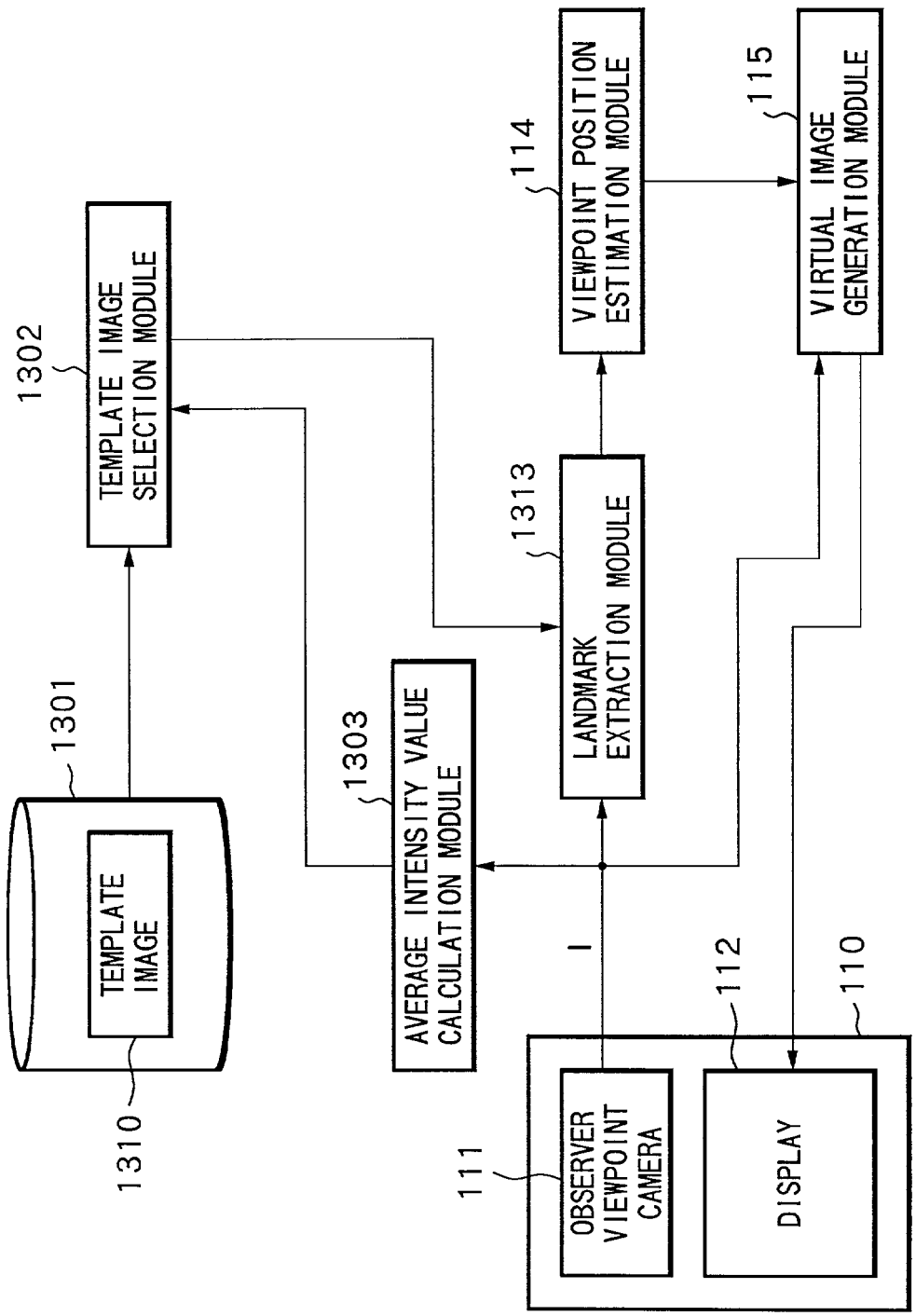
FIG. 13A is a block diagram showing a configuration of the MR system according to a fourth embodiment.

FIG. 13A is a block diagram showing a configuration of the MR system according to the fourth embodiment. Reference numeral 1301 denotes a template image storing unit, in which two or more kinds of template images 1310 are registered for each of a plurality of landmarks. Reference numeral 1302 denotes a template image selection module, which selects one template image out of a plurality of template images stored in the template image storing unit 1301, for each landmark. In this example, template images that are used are selected on the basis of the average intensity value with an average intensity value calculation module 1303, from images photographed at that point in time by the observer viewpoint camera 111 mounted on the HMD 110 (described later in detail). Therefore, in the template image storing unit 1301, the template image to be used is classified and stored according to ranges of intensity values, as shown in FIG. 13B. Furthermore, since the intensity value to change the template image is different for each landmark, there may be cases where the same template image is used even for different ranges of intensity values, as shown in FIG. 13B. For example, for the landmark #1, the same template image $T_{1B}$ is used for both ranges of intensity values B and C.

Using the template image obtained by the template image selection module 1302, the landmark detection module 1313 performs template matching for the observer viewpoint image I to detect the landmark. The viewpoint position estimation module 114, the virtual image generation module 115 and the HMD 110 are same as those described in the first embodiment (FIG. 1).

The average intensity value calculation module 1303 calculates an average intensity value from the photographed image from the observer viewpoint camera 111 mounted on the HMD 110, and provides the result of the calculation to the template image selection module 1302. The template image selection module 1302 selects the template image of each landmark from the template image storing unit 1301, based on this average intensity value, and outputs the template image to the landmark detection module 1313.

Figure 14:
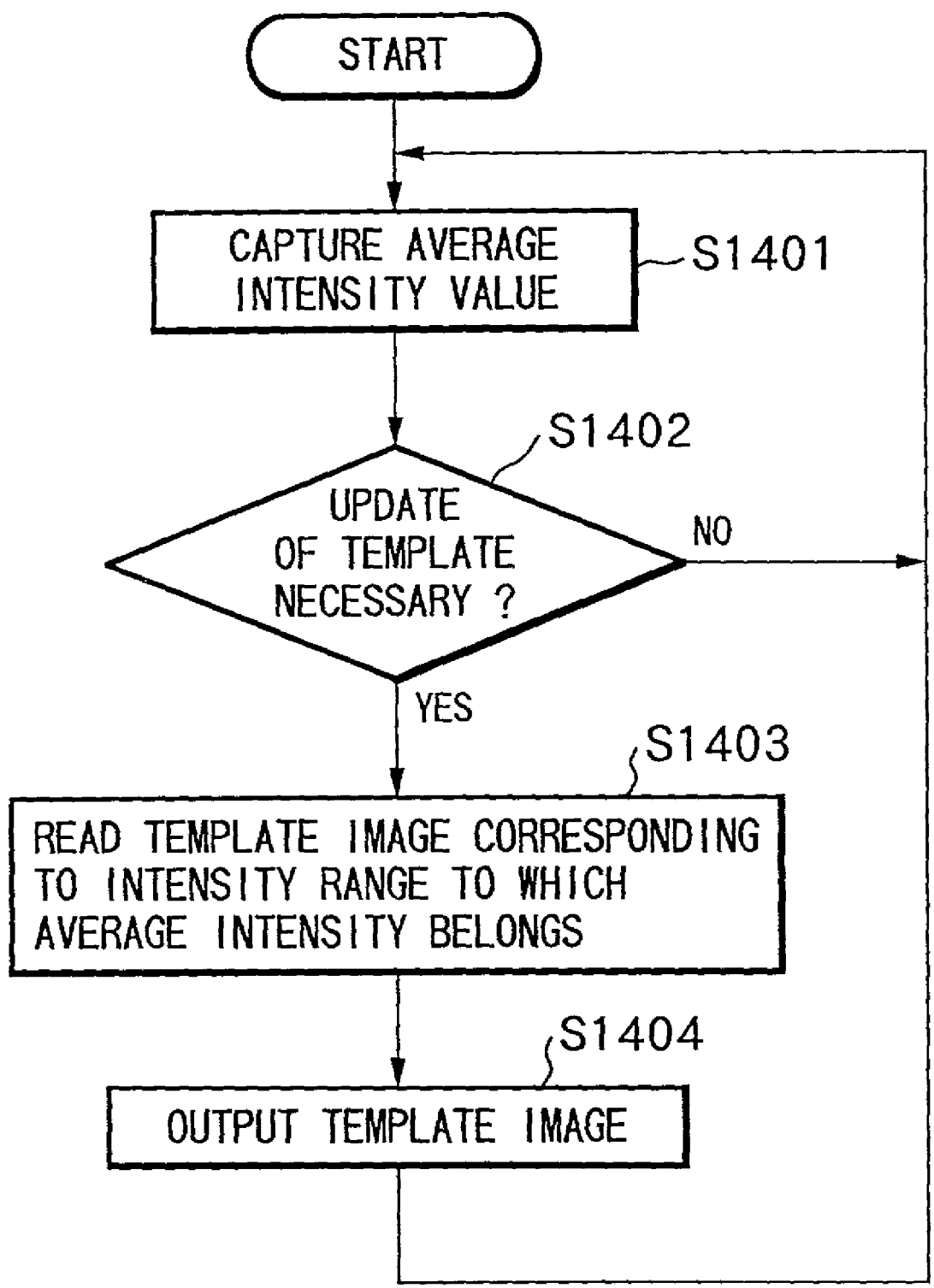
FIG. 14 is a flowchart illustrating a processing procedure of a template image selection module according to a fourth embodiment.

FIG. 14 is a flowchart illustrating a processing procedure of the template image selection module according to the fourth embodiment. First, in Step S1401, the average intensity value is captured from the average intensity calculation module 1303. And, in Step S1402, whether the range of intensity values is changed is determined. For example, if the range of intensity values of the template image that is currently used is a range A, whether or not the average intensity value captured in Step S1401 belongs to another range of intensity values (B or C) is determined. If the range of intensity values is changed, advancement to Step S1403 is made, and a group of template images corresponding to the intensity range to which new average intensity values belong are read. And, in Step S1404, a group of those template images are outputted to the landmark detection module 1313.

As described above, according to the fourth embodiment, since appropriate ones are selected from two or more kinds of template images prepared in advance for use in template matching without using a fixed camera, correct template matching can be achieved without providing a fixed camera separately.

Furthermore, the switching of template images may be performed in accordance with not only the average intensity value but also time periods of morning, daytime and evening. Alternatively, it is also possible to make arrangements so that the observer inputs weather conditions such as clear, cloudy and rainy, and in accordance therewith, the template image selection module 1302 switches template images.

Furthermore, in the aforementioned example, the template image is selected from one group of template images, but arrangements may be made so that two or more groups of template images are prepared responding to the landmark observed from a plurality of positions, and a group of template images to be used is selected therefrom, and the template image is obtained from the selected group of template images in accordance with the average intensity value. In this case, two or more groups of template images may be brought into correspondence with a plurality of fixed cameras in the second and third embodiments. Therefore, configuration may be made so that a group of template images is selected from the position of the observer.

Furthermore, it is possible to narrow the seek range in template matching (for example, methodologies described with FIGS. 5A and 5B of the first embodiment), as a matter of course.

[Fifth Embodiment]

In the aforementioned first to third embodiments, the template image is defined as a detection parameter, and template matching is used for detection of the landmark, but template matching is not necessarily used for detection of the landmark. For example, in the case where markers using color features (color markers) are used as landmarks, detection of the landmark can be performed by defining color parameters representing color features of markers as detection parameters and extracting specified color areas.

Figure 15:
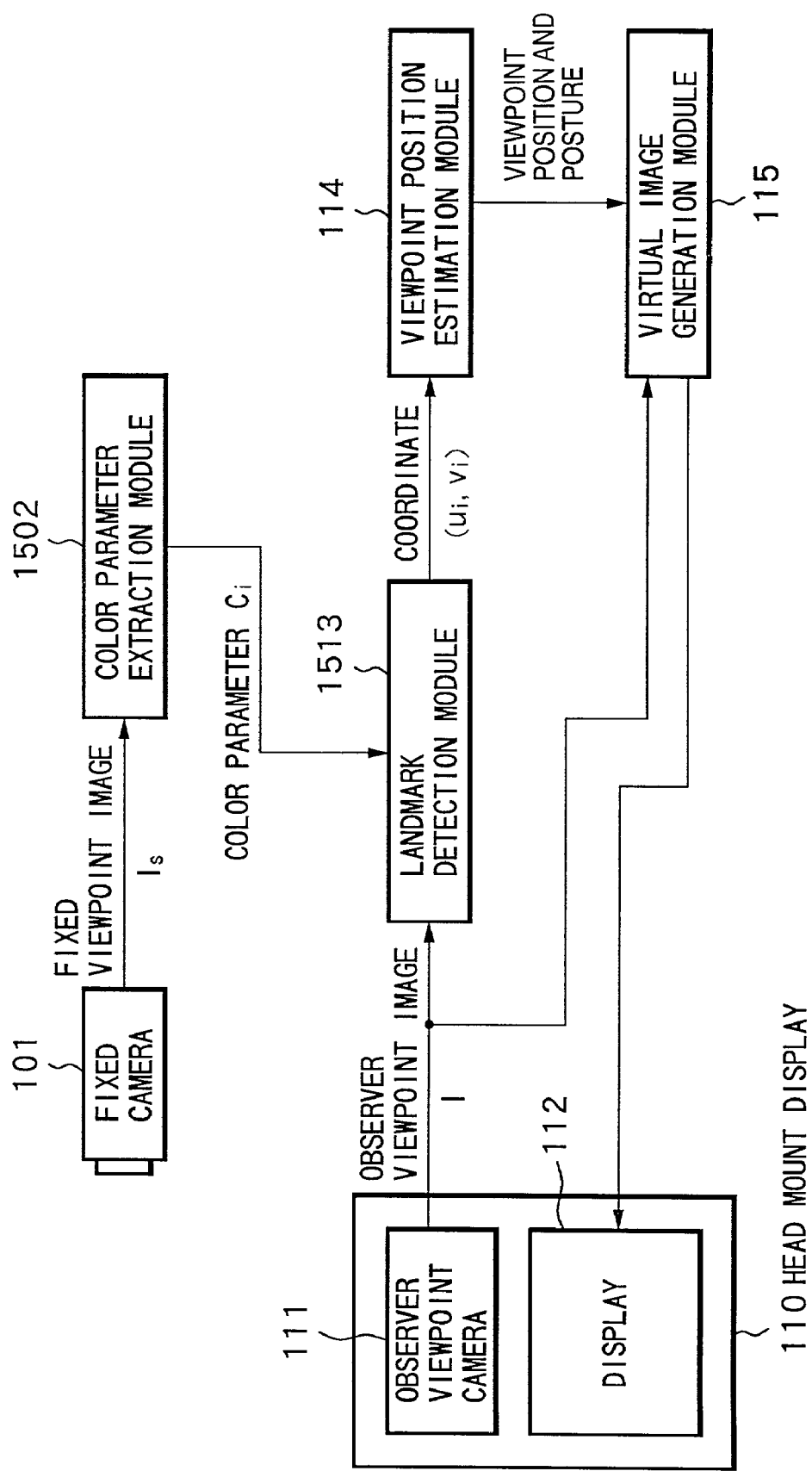
FIG. 15 is a block diagram illustrating a configuration of the MR system according to a fifth embodiment.

FIG. 15 is a block diagram illustrating a configuration of the MR system according to this embodiment. In FIG. 15, the fixed camera 101, the HMD 110, the observer camera 111, the display 112, the viewpoint position estimation module 114 and the virtual image generation module 115 are similar to those in the first embodiment.

Reference numeral 1502 denotes a color parameter extraction module, which generates from the fixed viewpoint image $I_s$ a color parameter $C_i$ for detecting each landmark $P_i$. For example, a landmark existence range (red minimum value Rmin, red maximum value Rmax, green minimum value Gmin, green maximum Gmax, blue minimum value Bmin, blue maximum value Bmax) in a RGB color space is determined, based on the distribution in the RGB space of each pixel in the observance area $R_i$ (assuming in this embodiment that it is known and supplied from supplying means (not shown)) of the landmark $P_i$ on the fixed viewpoint image $I_s$, and this range is defined as the color parameter $C_i$ representing the color feature of the landmark. This color parameter $C_i$ is outputted for each predetermined timing to a landmark detection module described later.

Reference numeral 1513 denotes a landmark detection module, which extracts pixels included in the color area defined as the color parameter $C_i$ from the observer viewpoint image I, based on the color parameter $C_i$ provided from the color parameter extraction module 1502, thereby detecting the landmark $P_i$. In this way, because the color parameter $C_i$ can be defined based on the fixed camera image $I_s$ photographed at a time almost same as the observer viewpoint image I (namely, photographed under a light source environment almost same as the observer viewpoint image I), stable detection of color markers can always be performed even under situations where the light source environment is dynamically changed as in the case of outdoor environments, thus making it possible to achieve correct detection of landmark positions. Furthermore, in this embodiment, the landmark existence range in the RGB color space is used as the color parameter $C_i$, but any color space and color feature that are generally used for extraction of color features may be used as a matter of course, and brightness information for light and dark images may be used as parameters. Also, the type of detection parameters should not be limited to template images and color features, and any detection parameters for detecting landmarks from images may be used.

[Sixth Embodiment]

In the aforementioned first to fifth embodiments, the number of observer viewpoint cameras for which one wants to detect the landmark position on the photographed image is one, but the number of observer viewpoint cameras is not necessarily one. For example, in the case where observer viewpoint cameras 111A to 111D corresponding respectively to a plurality of observers (in this case, four observers of A to D) exist, and landmark positions on observer viewpoint images $I_A$ to $I_D$ photographed by those cameras, landmark detection modules 113A to 113D corresponding to each thereof may be provided to update the template image for each of these landmark detection modules 113A to 113D, using the configuration of template image creation module 102 similar to those in the aforementioned first to fourth embodiments.

As described above, according to the aforementioned embodiment, the landmark can be detected correctly from the photographed image even if the environment during picture taking is changed to cause a change in how the specific point is viewed. Also, according to each embodiment, because correct detection of the landmark is ensured against changes in environments, compatibility between accurate virtual-real registration and free movement in the outdoors can be achieved in the MR technique.

Furthermore, in the aforementioned embodiments 1 to 6, application to the MR system of the video see-through mode has been described, application to uses in which measurement of the viewpoint position is required, for example the MR of the optical see-through mode is also possible as a matter of course, and application to uses other than the MR is possible as long as they are uses in which the coordinate of the specified section of a static object is detected from the image photographed by the camera.

As described above, according to the present invention, specific points can be reliably detected from a photographed image even if the environment during picture taking is changed to cause a change in how the specific point is viewed.

As many apparently widely different embodiments of the present invention can be made without departing from the spirit and scope thereof, it is to be understood that the invention is not limited to the specific embodiments thereof except at defined in the claims.

What is claimed is:

1. A specific point detecting device for detecting a position of a specific point on a target image, comprising:
    first input means for inputting a target image photographed by first photographing means that is movable;
    second input means for inputting an image photographed by second photographing means having a position and orientation that are known;
    updating means for updating detection parameters for detecting said specific point based on an image photographed by the second photographing means;
    detecting means for detecting the position of said specific point on said target image, based on the detection parameters updated by said updating means; and
    estimation means for estimating viewpoint information of the first photographing means using the detected position of said specific point on said target image.

2. The device according to claim 1,
    wherein said specific point is a static specific point in a real space.

3. The device according to claim 2, wherein the viewpoint information includes a position and orientation of the first photographing means, and
    wherein said estimation means estimates the viewpoint information based on the detected position and known position information of said specific point.

4. The device according to claim 2, wherein a plurality of photographing units are utilized as the first photographing means.

5. The device according to claim 2, wherein the position and orientation of the second photographing means are fixed.

6. The device according to claim 5, wherein there are a plurality of second photographing means, and
    said updating means updates said detection parameters based on a plurality of images photographed by the plurality of second photographing means.

7. The device according to claim 6,
    wherein said plurality of second photographing means photographs one or more specific points in an overlapping manner,
    said updating means updates detection parameters for the same specific point respectively based on photographed images obtained by a plurality of second photographing means, and
    said detecting means detects the specific point based on a plurality of detection parameters with respect to the same point.

8. The device according to claim 7,
    wherein said detecting means uses detection parameters updated, by said updating means, based on the image photographed by the second photographing means nearest to the first photographing means.

9. The device according to claim 1,
wherein if there are a plurality of detection parameters corresponding to the same specific point, said detecting means detects the specific point based on each detection parameter, and a detected position by the detection parameter having the best evaluation value of detection accuracy is adopted, thereby detecting the position of the specific point.

10. The device according to claim 1,
wherein said updating means comprises supplying means for supplying the position or area of said specific point on the image photographed by the second photographing means, and
extracts a partial image including said specific point from the image photographed by the second photographing means based on the position or area supplied by said supplying means, and updates said detection parameters based on the partial image.

11. The device according to claim 10,
wherein said supplying means retains as known information the three-dimensional position of said specific point and camera parameters of said second photographing means,
comprises specific point position calculating means for calculating the position of said specific point on the image photographed by the second photographing means, based on the three-dimensional position of said specific point and the camera parameters of said second photographing means, and
supplies the position calculated by said specific point position calculating means.

12. The device according to claim 10,
wherein said supplying means comprises feature extracting means for extracting a featured partial area from the image photographed by the second photographing means, and
supplies the position or area of said featured partial area extracted by said feature extracting means.

13. The device according to claim 1,
wherein said updating means updates detection parameters based on a plurality of photographed images photographed at a plurality of times by said second photographing means.

14. The device according to claim 1,
wherein said updating means determines timing in which update of detection parameters is performed, based on the contents of the image photographed by the second photographing means.

15. The device according to claim 14,
wherein said updating means controls update of detection parameters, based on changes in detection parameters updated by said updating means.

16. The device according to claim 1,
wherein said updating means performs update of detection parameters, if a degree of difference between a new image photographed by the second photographing means and an image photographed by the second photographing means at the time of latest update of detection parameters exceeds a predetermined value.

17. The device according to claim 1,
wherein said updating means updates detection parameters at a predetermined time interval.

18. The device according to claim 1,
wherein said updating means comprises storing means for storing two or more kinds of detection parameters prepared in advance for each of said specific points, and
selecting means for selecting a detection parameter for detecting each specific point from two or more kinds of detection parameters stored in said storing means, in such a way as to follow changes in how the specific point is viewed, and
updates current detection parameters to detection parameters selected by said selecting means.

19. The device according to claim 18,
wherein said selecting means selects detection parameters based on the average intensity value of said target image.

20. The device according to claim 1,
wherein said detection parameter is a template image including said specific points, and
said detecting means performs template matching for said target image to detect the positions of said specific points on said image.

21. The device according to claim 1,
wherein said detection parameters are information expressing color and/or intensity unique to said specific points, and
said detecting means extracts areas having the color and/or intensity unique to said specific points from said target image, thereby detecting the positions of said specific points on the image.

22. A specific point detecting method of detecting a position of a specific point on a target image, comprising:
the first inputting step of inputting a target image photographed by first photographing means that is movable;
the second inputting step of inputting an image photographed by second photographing means having a position and orientation that are known;
the updating step of updating detection parameters for detecting said specific point based on an image photographed by the second photographing means;
the detecting step of detecting the position of said specific point on said target image, based on the detection parameters updated in said updating step; and
the estimation step of estimating viewpoint information for the first photographing means using the detected position of said specific point on said target image.

23. The method according to claim 22,
wherein said specific point is a static specific point in a real space.

24. The method according to claim 23, wherein the viewpoint information includes a position and orientation of the first photographing means, and
wherein said estimation step includes estimating the viewpoint information based on the detected position and known position information of said specific point.

25. The method according to claim 23, wherein a plurality of photographing units are utilized as the first photographing means.

26. The method according to claim 23, wherein the position and orientation of the second photographing means are fixed.

27. The method according to claim 26, wherein there are a plurality of second photographing means, and
in said updating step, said detection parameters are generated, based on a plurality of images photographed by the plurality of second photographing means.

28. The method according to claim 27,
wherein said plurality of second photographing means photographs one or more specific points in an overlapping manner, and in said updating step, detection parameters for the same specific point are generated respectively based on photographed images obtained by a plurality of second photographing means, and in said detecting step, the specific point is detected, based on a plurality of detection parameters with respect to the same point.

29. The method according to claim 28, said detecting step uses detection parameters updated, in said updating step, based on the image photographed by the second photographing means nearest to the first photographing means.

30. The method according to claim 22, wherein in said detecting step, if there is a plurality of detection parameters corresponding to the same specific point, the specific point is detected based on each detection parameter, and a detected position from the detection parameter having the best evaluation value of detection accuracy is adopted, thereby detecting the position of the specific point.

31. The method according to claim 22, said updating step comprising a supplying step of supplying the position or area of said specific point on the image photographed by the second photographing means, and wherein a partial image including said specific point is extracted from the image photographed by the second photographing means based on the position or area supplied from said supplying step, and updates said detection parameters are generated based on the partial image.

32. The method according to claim 31, wherein in said supplying step, the three-dimensional position of said specific point and camera parameters of said second photographing means are retained as known information, the specific point position calculating step of calculating the position of said specific point on the image photographed by the second photographing means, based on the three-dimensional position of said specific point and the camera parameters of said second photographing means is comprised, and the position calculated in said specific point position calculating step is supplied.

33. The method according to claim 31, wherein said supplying step comprises the feature extracting step of extracting a featured partial area from the image photographed by the second photographing means and the position or area of said featured partial area extracted in said feature extracting step is supplied.

34. The method according to claim 22, wherein in said updating step, detection parameters are updated based on a plurality of photographed images photographed at a plurality of times in said second photographing step.

35. The method according to claim 22, wherein in said updating step, timing in which update of detection parameters is performed is determined based on the contents of the image photographed by the second photographing means.

36. The method according to claim 35, wherein in said updating step, update of detection parameters is controlled, based on changes in detection parameters updated in said updating step.

37. The method according to claim 22, wherein in said updating step, update of detection parameters is performed, if a degree of difference between a new image photographed by the second photographing means and an image photographed by the second photographing means at the time of latest update of detection parameters exceeds a predetermined value.

38. The method according to claim 22, wherein in said updating step, detection parameters are updated at a predetermined time interval.

39. The method according to claim 22, said updating step comprising:

the storing step of storing two or more kinds of detection parameters prepared in advance for each of said specific points, and the selecting step of selecting a detection parameter for detecting each specific point from two or more kinds of detection parameters stored in said storing step, in such a way as to follow changes in how the specific point is viewed, wherein current detection parameters are updated to detection parameters selected in said selecting step.

40. The method according to claim 39, wherein in said selecting step, detection parameters are selected based on the average intensity value of said target image.

41. The method according to claim 22 wherein said detection parameter is a template image including said specific points, and in said detecting step, template matching is performed for said target image to detect the positions of said specific points.

42. The method according to claim 22, wherein said detection parameters are information expressing color and/or intensity unique to said specific points, and in said detecting step, areas having the color and/or intensity unique to said specific points are extracted from said target image, thereby detecting the positions of said specific points on the image.

43. A computer readable memory which stores a program for making a computer execute a specific point detecting method of detecting a position of a specific point on a target image, wherein said method comprises:

a first input step of inputting a target image photographed by first photographing means that is movable;

a second input step of inputting an image photographed by second photographing means having a position and orientation that are known;

an updating step of updating detection parameters for detecting said specific point based on an image photographed by the second photographing means;

a detecting step of detecting the position of said specific point on said target image, based on the detection parameters updated in said updating step; and an estimation step of estimating viewpoint information of said first photographing means using the detected position of said specific point on said target image.

44. A specific point detecting device for detecting a position of a specific point on a target image, comprising:

a first input unit configured to input a target image photographed by a first photographing unit that is movable;

a second input unit configured to input an image photographed by a second photographing unit having a position and orientation that are known;

an updating unit configured to update detection parameters for detecting said specific point based on an image photographed by the second photographing unit;

a detecting unit configured to detect the position of said specific point on said target image, based on the detection parameters updated by said updating unit; and an estimation unit configured to estimate viewpoint information of said first photographing unit using the detected position of said specific point on said target image.

* * * * *

UNITED STATES PATENT AND TRADEMARK OFFICE
CERTIFICATE OF CORRECTION

PATENT NO. : 6,968,084 B2
DATED : November 22, 2005
INVENTOR(S) : Kiyohide Satoh It is certified that error appears in the above-identified patent and that said Letters Patent is hereby corrected as shown below:

Column 1,
Line 50, "based" should read -- are based --.
Line 59, "based on patterns, for example," should read -- are based on patterns, there is known a method wherein --.

Column 4,
Line 18, "one" should read -- on --.

Column 5,
Line 10, "I," should read -- I are known, --.
Line 28, "wore" should read -- worn --.

Column 6,
Line 15, "landmark" should read -- landmarks --.
Line 47, "send" should read -- the sending --.

Column 7,
Line 39, "pixel" should read -- pixels --.

Column 8,
Line 12, "landmarks" should read -- landmarks have been obtained, --.

Column 10,
Line 10, "peripheral" should read -- periphery --.
Line 22, "by" should read -- are obtained by --.
Line 38, "landmarks" should read -- landmark --.
Line 58, "embodiment" should read -- embodiment. --; and "for" should read -- For --.

UNITED STATES PATENT AND TRADEMARK OFFICE
CERTIFICATE OF CORRECTION

PATENT NO. : 6,968,084 B2
DATED : November 22, 2005
INVENTOR(S) : Kiyohide Satoh It is certified that error appears in the above-identified patent and that said Letters Patent is hereby corrected as shown below:

Column 12,
Line 37, "exist" should read -- exists --.

Column 13,
Line 7, "a" should be deleted.

Column 19,
Line 29, "updates" should read -- updates of --.

Signed and Sealed this

Thirtieth Day of May, 2006

JON W. DUDAS
*Director of the United States Patent and Trademark Office*